United States Patent
Moon et al.

(10) Patent No.: US 12,526,080 B2
(45) Date of Patent: Jan. 13, 2026

(54) METHOD AND APPARATUS FOR SCHEDULING AND HYBRID AUTOMATIC REPEAT REQUEST FEEDBACK IN COMMUNICATION SYSTEM

(71) Applicant: ELECTRONICS AND TELECOMMUNICATIONS RESEARCH INSTITUTE, Daejeon (KR)

(72) Inventors: Sung Hyun Moon, Daejeon (KR); Cheul Soon Kim, Daejeon (KR); Jung Hoon Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 402 days.

(21) Appl. No.: 17/522,643

(22) Filed: Nov. 9, 2021

(65) Prior Publication Data

US 2022/0149996 A1 May 12, 2022

(51) Int. Cl.
*H04L 1/1812* (2023.01)
*H04L 1/1607* (2023.01)
(Continued)

(52) U.S. Cl.
CPC .......... *H04L 1/1812* (2013.01); *H04L 1/1678* (2013.01); *H04L 5/0055* (2013.01);
(Continued)

(58) Field of Classification Search
CPC ................ H04W 72/21; H04W 72/23; H04W 72/044; H04W 72/1273; H04L 1/1812; H04L 1/1678; H04L 5/0055
See application file for complete search history.

(56) References Cited

U.S. PATENT DOCUMENTS 11,252,713 B2 * 2/2022 You .......................... H04L 5/00
2018/0332566 A1 * 11/2018 You .......................... H04L 5/00
(Continued)

FOREIGN PATENT DOCUMENTS

| CN | 113692769 A | * | 11/2021 | .......... H04L 1/1671 |
| EP | 3829245 A1 | * | 6/2021 | .......... H04L 5/0007 |

(Continued)

OTHER PUBLICATIONS

3GPP, "Technical Specification: 5G; NR; Physical layer procedures for control (3GPP TS 38.213 version 16.2.0 Release 16) ETSI TS 138 213 V16.2.0 (Jul. 2020)", 3rd Generation Partnership Project, Entire Document, <https://www.etsi.org/deliver/etsi_ts/138200_138299/138213/16.02.00_60/ts_138213v160200p>. (Year: 2020).*

(Continued)

*Primary Examiner* — Kenny S Lin
(74) *Attorney, Agent, or Firm* — Rabin & Berdo, P.C.

(57) ABSTRACT

An operation method of a terminal in a communication system may comprise: receiving DCI from a base station; identifying a plurality of start and length indicator values (SLIVs) indicated by a time domain resource assignment field included in the DCI; determining a plurality of PDSCH resources based on the plurality of SLIVs; receiving a plurality of PDSCHs from the base station through the plurality of PDSCH resources; and transmitting, to the base station, a plurality of HARQ-ACKs in response to the plurality of PDSCHs.

19 Claims, 7 Drawing Sheets

(51) Int. Cl.
  *H04L 5/00* (2006.01)
  *H04W 72/044* (2023.01)
  *H04W 72/1273* (2023.01)
  *H04W 72/21* (2023.01)
  *H04W 72/23* (2023.01)

(52) U.S. Cl.
  CPC ..... *H04W 72/044* (2013.01); *H04W 72/1273* (2013.01); *H04W 72/21* (2023.01); *H04W 72/23* (2023.01)

(56) References Cited

U.S. PATENT DOCUMENTS

| | | | |
|---|---|---|---|
| 2019/0103947 A1 | 4/2019 | Park | |
| 2019/0149365 A1* | 5/2019 | Chatterjee | H04L 25/0226 370/329 |
| 2020/0053750 A1 | 2/2020 | Vos | |
| 2020/0195388 A1 | 6/2020 | Seo et al. | |
| 2020/0221428 A1 | 7/2020 | Moon et al. | |
| 2020/0236664 A1* | 7/2020 | You | H04L 1/0079 |
| 2020/0267597 A1* | 8/2020 | Huang | H04W 76/14 |
| 2020/0351926 A1* | 11/2020 | Bagheri | H04W 72/23 |
| 2021/0014883 A1 | 1/2021 | Khoshnevisan et al. | |
| 2021/0307044 A1* | 9/2021 | Bae | H04W 72/1273 |
| 2022/0045805 A1* | 2/2022 | Karaki | H04L 1/1864 |
| 2022/0110128 A1* | 4/2022 | Takahashi | H04L 5/0044 |
| 2022/0159692 A1* | 5/2022 | Lee | H04L 5/0053 |
| 2022/0167320 A1* | 5/2022 | Lee | H04W 72/23 |
| 2022/0191882 A1* | 6/2022 | Lee | H04W 72/56 |
| 2022/0248410 A1* | 8/2022 | Lee | H04W 52/32 |
| 2022/0279564 A1* | 9/2022 | Li | H04W 72/23 |
| 2022/0399960 A1* | 12/2022 | Bae | H04L 5/00 |
| 2023/0042313 A1* | 2/2023 | Chen | H04L 1/1887 |
| 2023/0216614 A1* | 7/2023 | Wang | H04L 1/189 370/329 |
| 2023/0397226 A1* | 12/2023 | Matsumura | H04W 72/1268 |

FOREIGN PATENT DOCUMENTS

| | | | | |
|---|---|---|---|---|
| EP | 3920635 A1 * | 12/2021 | | H04L 1/1671 |
| EP | 3920635 B1 * | 5/2023 | | H04L 1/1671 |
| EP | 4395199 A2 * | 7/2024 | | H04B 7/06968 |
| KR | 10-2020-0035790 A | 4/2020 | | |
| WO | 2020/032695 A1 | 2/2020 | | |
| WO | 2020/145567 A1 | 7/2020 | | |
| WO | WO-2020197333 A1 * | 10/2020 | | H04L 5/0044 |
| WO | WO-2020204486 A1 * | 10/2020 | | H04L 1/1671 |
| WO | WO-2020204800 A1 * | 10/2020 | | H04W 72/0446 |

OTHER PUBLICATIONS

3GPP, "Technical Specification: 5G; NR; Physical layer procedures for data (3GPP TS 38.214 version 16.2.0 Release 16) ETSI TS 138 214 V16.2.0 (Jul. 2020)", 3rd Generation Partnership Project, Entire Document, <https://www.etsi.org/deliver/etsi_ts/138200_138299/138214/>. (Year: 2020).*

* cited by examiner

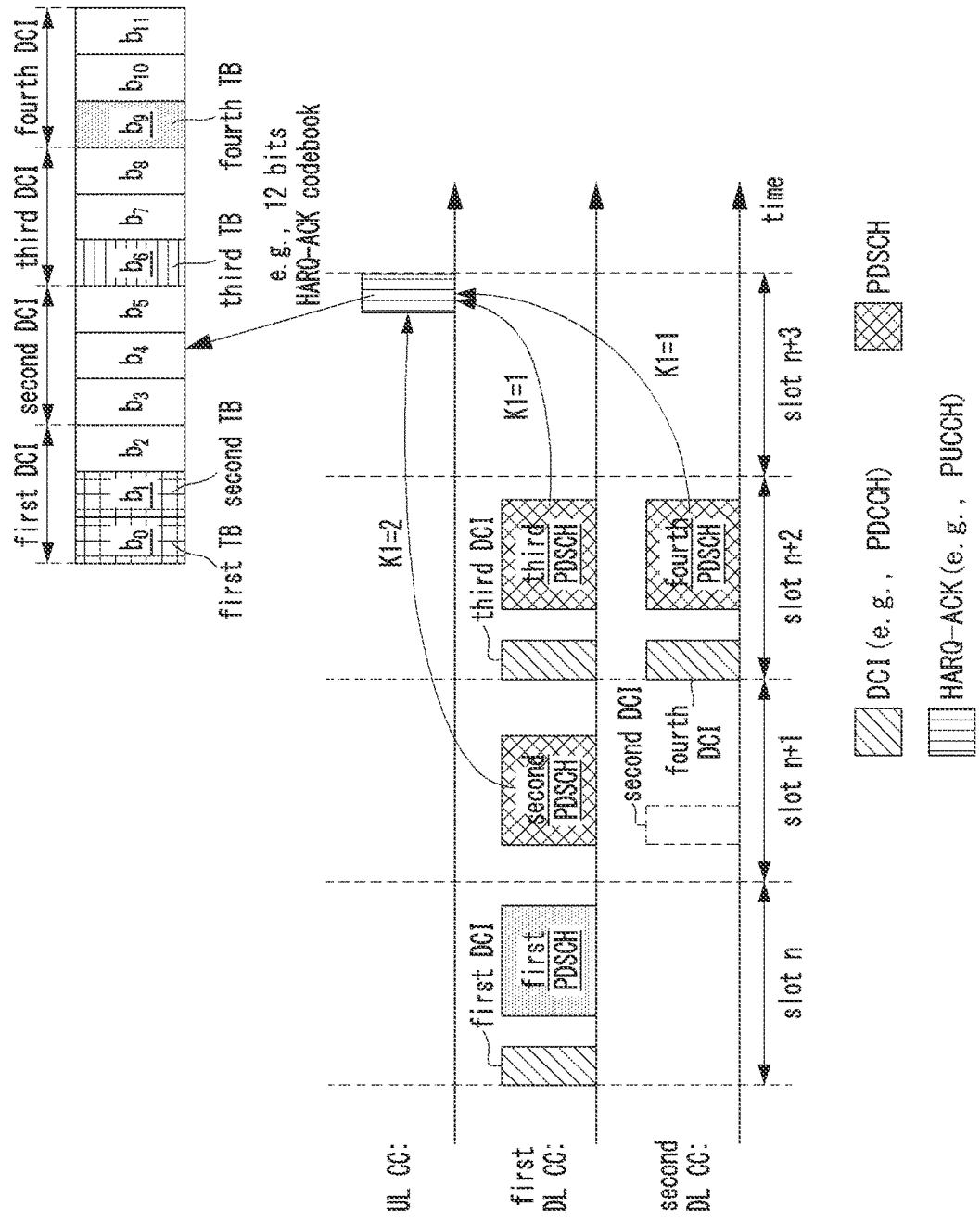

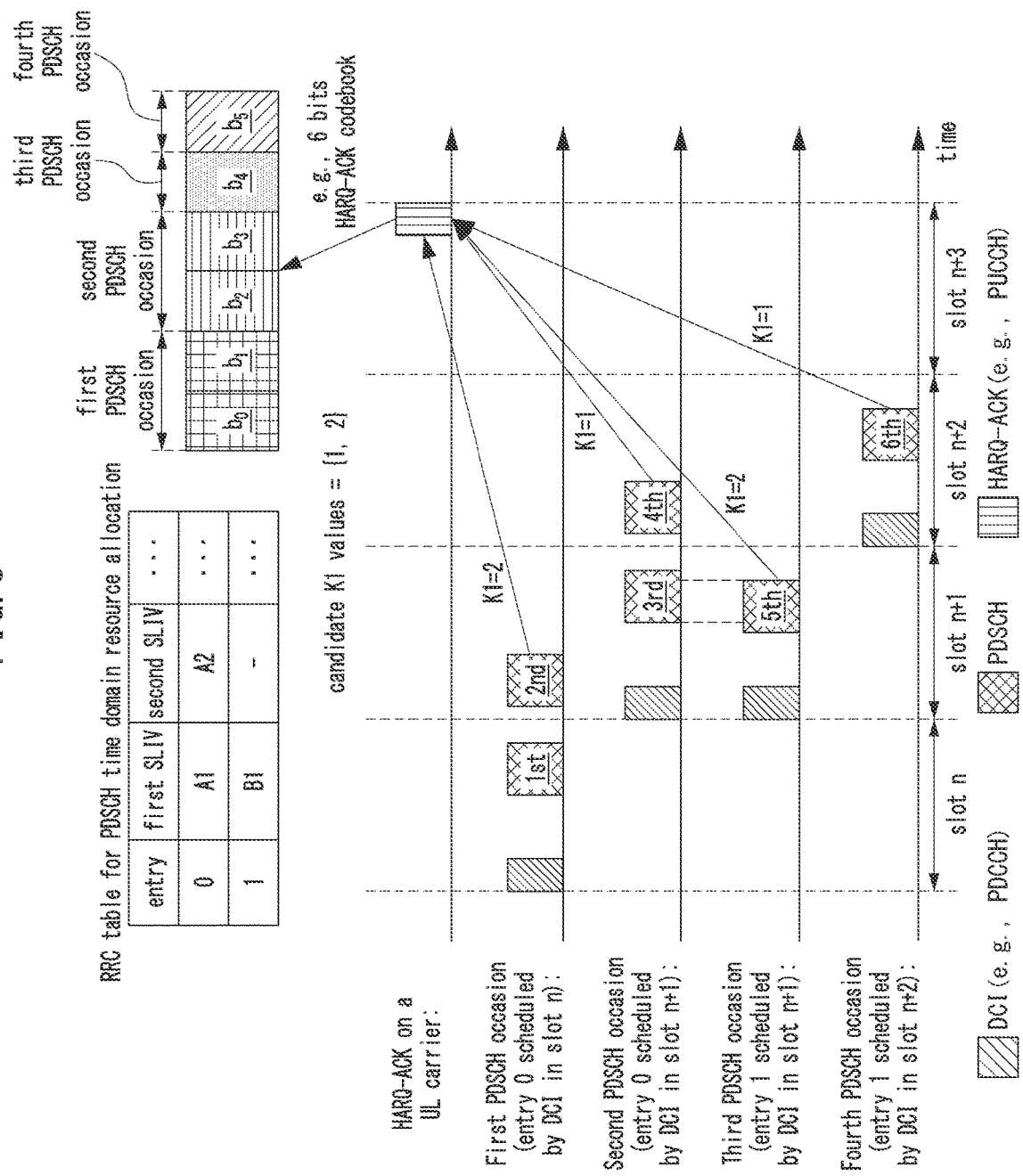

METHOD AND APPARATUS FOR SCHEDULING AND HYBRID AUTOMATIC REPEAT REQUEST FEEDBACK IN COMMUNICATION SYSTEM

CROSS-REFERENCE TO RELATED APPLICATIONS

This application claims priority to Korean Patent Applications No. 10-2020-0149491 filed on Nov. 10, 2020, and No. 10-2021-0142956 filed on Oct. 25, 2021 with the Korean Intellectual Property Office (KIPO), the entire contents of which are hereby incorporated by reference.

BACKGROUND

1. Technical Field

The present disclosure relates to a technique for scheduling and hybrid automatic repeat request (HARQ) feedback in a communication system, and more particularly, to a technique for scheduling of a data channel and a technique of performing HARQ feedback for a data channel.

2. Related Art

The communication system (e.g., new radio (NR) communication system or 6G communication system) using a higher frequency band (e.g., a frequency band of 6 GHz or above) than a frequency band (e.g., a frequency band of 6 GHz or below) of the long term evolution (LTE) communication system (or, LTE-A communication system) is being considered for processing of soaring wireless data. The NR communication system and/or 6G communication system may support not only a frequency band of 6 GHz or below, but also a frequency band of 6 GHz or above, and may support various communication services and scenarios compared to the LTE system. In addition, requirements of the NR communication system and/or 6G communication system may include enhanced Mobile BroadBand (eMBB), Ultra Reliable Low Latency Communication (URLLC), and Massive Machine Type Communication (mMTC). Communication technologies are needed to satisfy the requirements of the eMBB, URLLC, and mMTC.

In particular, when separate downlink control information (DCI) is used for scheduling each of a plurality of physical downlink shared channels (PDSCHs) in a transmission procedure of the plurality of PDSCHs, a downlink signaling overhead may increase. In addition, when a plurality of hybrid automatic repeat request acknowledgements (HARQ-ACKs) for the plurality of PDSCHs are transmitted through different physical uplink control channel (PUCCH) resources, an uplink signaling overhead and a transmission delay may increase.

SUMMARY

Accordingly, exemplary embodiments of the present disclosure are directed to providing a method and an apparatus for scheduling of a data channel and performing HARQ feedback for the data channel.

According to a first exemplary embodiment of the present disclosure, an operation method of a terminal in a communication system may comprise: receiving downlink control information (DCI) from a base station; identifying a plurality of start and length indicator values (SLIVs) indicated by a time domain resource assignment field included in the DCI; determining a plurality of PDSCH resources based on the plurality of SLIVs; receiving a plurality of PDSCHs from the base station through the plurality of PDSCH resources; and transmitting, to the base station, a plurality of HARQ-ACKs in response to the plurality of PDSCHs.

The plurality of HARQ-ACKs may be transmitted through one PUCCH resource, and the one PUCCH resource may be indicated by HARQ-ACK timing information included in the DCI.

The plurality of HARQ-ACKs may be included in one HARQ-ACK codebook, and the one HARQ-ACK codebook may be transmitted to the base station through one PUCCH resource.

The size of the one HARQ-ACK codebook may be determined based on a specific value instead of the number of the plurality of PDSCHs, and the specific value may be the maximum number of PDSCHs schedulable by one DCI.

The specific value may be B, the number of the plurality of PDSCHs may be C, B bits included in the one HARQ-ACK codebook may correspond to the one DCI, the plurality of HARQ-ACKs may be mapped to C bits among the B bits, a predefined value may be mapped to the remaining (B-C) bits among the B bits, B may be a natural number, and C may be an integer greater than or equal to 0 and less than or equal to B.

A transmission timing of the one HARQ-ACK codebook may be determined based on a reception timing of a last PDSCH among the plurality of PDSCHs.

The number of the plurality of PDSCHs may be implicitly indicated by the number of the plurality of SLIVs.

The operation method may further comprise receiving configuration information of a time resource list from the base station, wherein the time resource list may include a plurality of entries each indicating a time resource, each of one or more entries among the plurality of entries may indicate two or more SLIVs, and the time domain resource assignment field may indicate one entry among the one or more entries.

The operation method may further comprise transmitting, to the base station, information indicating the maximum number of PDSCHs schedulable within one slot.

The DCI may support both single PDSCH scheduling and multi-PDSCH scheduling, the DCI may schedule one PDSCH when the single PDSCH scheduling is performed, and the DCI may schedule the plurality of PDSCHs when the multi-PDSCH scheduling is performed.

According to a second exemplary embodiment of the present disclosure, an operation method of a base station in a communication system may comprise: transmitting DCI to a terminal; transmitting, to the terminal, a plurality of PDSCHs through a plurality of PDSCH resources based on a plurality of SLIVs indicated by a time domain resource assignment field included in the DCI; and receiving, from the terminal, a plurality of HARQ-ACKs that are responses to the plurality of PDSCHs.

The plurality of HARQ-ACKs may be received through one PUCCH resource, and the one PUCCH resource may be indicated by HARQ-ACK timing information included in the DCI.

The plurality of HARQ-ACKs may be included in one HARQ-ACK codebook, and the one HARQ-ACK codebook may be received through one PUCCH resource.

The size of the one HARQ-ACK codebook may be determined based on a specific value instead of the number of the plurality of PDSCHs, and the specific value is the maximum number of PDSCHs schedulable by one DCI.

The specific value may be B, the number of the plurality of PDSCHs may be C, B bits included in the one HARQ-ACK codebook may correspond to the one DCI, the plurality of HARQ-ACKs may be mapped to C bits among the B bits, a predefined value may be mapped to the remaining (B-C) bits among the B bits, B may be a natural number, and C may be an integer greater than or equal to 0 and less than or equal to B.

A transmission timing of the one HARQ-ACK codebook may be determined based on a reception timing of a last PDSCH among the plurality of PDSCHs.

The number of the plurality of PDSCHs may be implicitly indicated by the number of the plurality of SLIVs.

The operation method may further comprise transmitting configuration information of a time resource list to the terminal, wherein the time resource list may include a plurality of entries each indicating a time resource, each of one or more entries among the plurality of entries may indicate two or more SLIVs, and the time domain resource assignment field may indicate one entry among the one or more entries.

The operation method may further comprise receiving, from the terminal, information indicating the maximum number of PDSCHs schedulable within one slot.

The DCI may support both single PDSCH scheduling and multi-PDSCH scheduling, the DCI may schedule one PDSCH when the single PDSCH scheduling is performed, and the DCI may schedule the plurality of PDSCHs when the multi-PDSCH scheduling is performed.

According to the exemplary embodiments of the present disclosure, the terminal may receive one downlink control information (DCI) for scheduling a plurality of PDSCHs from the base station, and may receive the plurality of PDSCHs from the base station according to the one DCI. Accordingly, the downlink signaling overhead can be reduced. In addition, the terminal may transmit one HARQ-ACK codebook composed of HARQ-ACKs for the plurality of PDSCHs to the base station by using one PUCCH resource. Accordingly, the uplink signaling overhead and transmission delay can be reduced.

BRIEF DESCRIPTION OF DRAWINGS

Exemplary embodiments of the present disclosure will become more apparent by describing in detail embodiments of the present disclosure with reference to the accompanying drawings, in which:

FIG. 7 is a conceptual diagram illustrating a first exemplary embodiment of a method for configuring a HARQ-ACK codebook for multi-PDSCH scheduling.

FIG. 8 is a conceptual diagram illustrating a second exemplary embodiment of a method for configuring a HARQ-ACK codebook for multi-PDSCH scheduling.

DETAILED DESCRIPTION OF THE EMBODIMENTS

Figure 1:
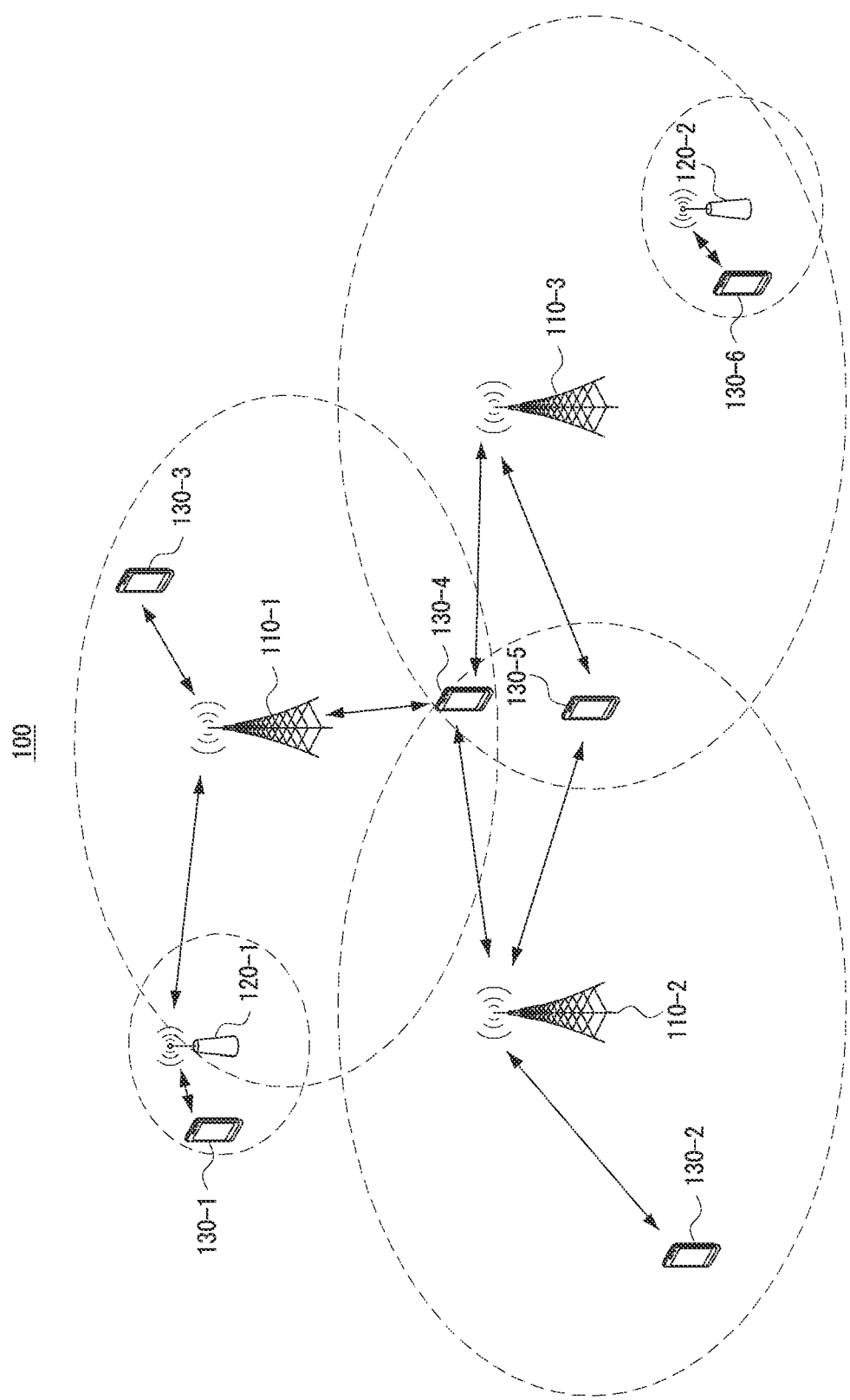
FIG. 1 is a conceptual diagram illustrating a first exemplary embodiment of a communication system.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication system to which exemplary embodiments according to the present disclosure are applied will be described. The communication system may be the 4G communication system (e.g., Long-Term Evolution (LTE) communication system or LTE-A communication system), the 5G communication system (e.g., New Radio (NR) communication system), or the like. The 4G communication system may support communications in a frequency band of 6 GHz or below, and the 5G communication system may support communications in a frequency band of 6 GHz or above as well as the frequency band of 6 GHz or below. The communication system to which the exemplary embodiments according to the present disclosure are applied is not limited to the contents described below, and the exemplary embodiments according to the present disclosure may be applied to various communication systems. Here, the communication system may be used in the same sense as a communication network, 'LTE' may refer to '4G communication system', 'LTE communication system', or 'LTE-A communication system', and 'NR' may refer to '5G communication system' or 'NR communication system'.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. Also, the communication system 100 may further comprise a core network (e.g., a serving gateway (S-GW), a packet data network (PDN) gateway (P-GW), and a mobility management entity (MME)). When the communication system 100 is a 5G communication system (e.g., New Radio (NR) system), the core network may include an access and mobility management function (AMF), a user plane function (UPF), a session management function (SMF), and the like.

The plurality of communication nodes 110 to 130 may support communication protocols defined in the 3rd generation partnership project (3GPP) technical specifications (e.g., LTE communication protocol, LTE-A communication protocol, NR communication protocol, or the like). The plurality of communication nodes 110 to 130 may support code division multiple access (CDMA) based communication protocol, wideband CDMA (WCDMA) based communication protocol, time division multiple access (TDMA) based communication protocol, frequency division multiple access (FDMA) based communication protocol, orthogonal frequency division multiplexing (OFDM) based communication protocol, filtered OFDM based communication protocol, cyclic prefix OFDM (CP-OFDM) based communication protocol, discrete Fourier transform-spread-OFDM (DFT-s-OFDM) based communication protocol, orthogonal frequency division multiple access (OFDMA) based communication protocol, single carrier FDMA (SC-FDMA) based communication protocol, non-orthogonal multiple access (NOMA) based communication protocol, generalized frequency division multiplexing (GFDM) based communication protocol, filter band multi-carrier (FBMC) based communication protocol, universal filtered multi-carrier (UFMC) based communication protocol, space division multiple access (SDMA) based communication protocol, or the like. Each of the plurality of communication nodes may have the following structure.

Figure 2:
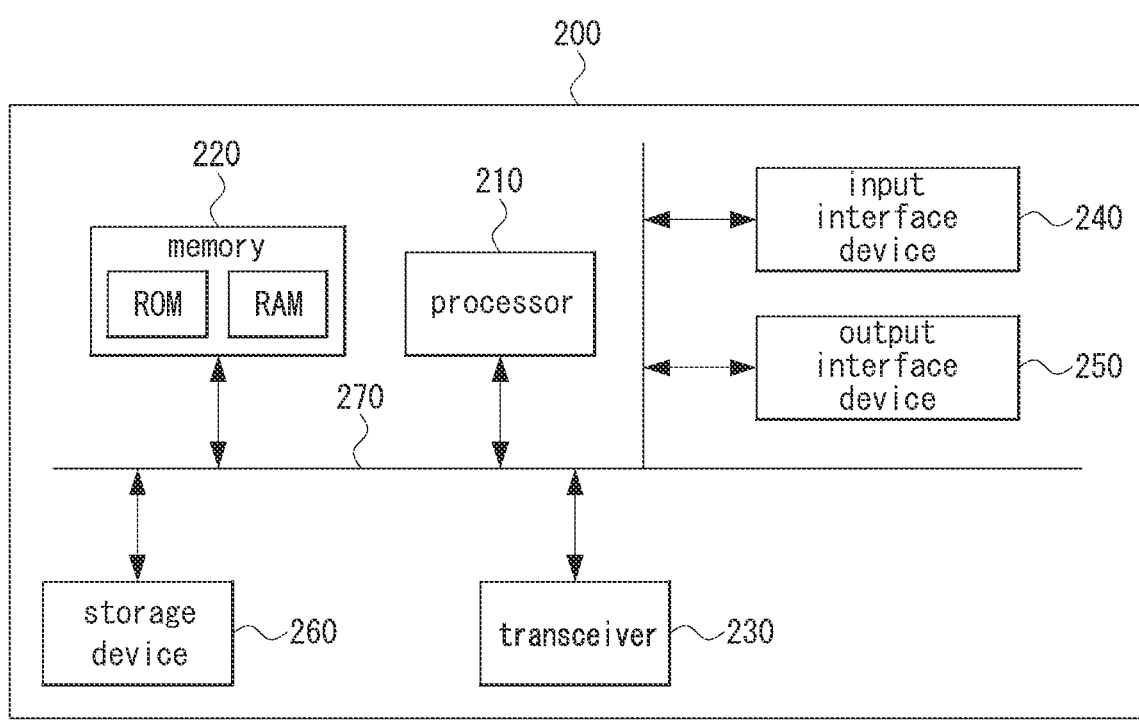
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. The respective components included in the communication node 200 may communicate with each other as connected through a bus 270.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring back to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to the cell coverage of the first base station 110-1. Also, the second terminal 130-2, the fourth terminal 130-4, and the fifth terminal 130-5 may belong to the cell coverage of the second base station 110-2. Also, the fifth base station 120-2, the fourth terminal 130-4, the fifth terminal 130-5, and the sixth terminal 130-6 may belong to the cell coverage of the third base station 110-3. Also, the first terminal 130-1 may belong to the cell coverage of the fourth base station 120-1, and the sixth terminal 130-6 may belong to the cell coverage of the fifth base station 120-2.

Here, each of the plurality of base stations 110-1, 110-2, 110-3, 120-1, and 120-2 may be referred to as NodeB (NB), evolved NodeB (eNB), gNB, advanced base station (ABS), high reliability-base station (HR-BS), base transceiver station (BTS), radio base station, radio transceiver, access point (AP), access node, radio access station (RAS), mobile multihop relay-base station (MMR-BS), relay station (RS), advanced relay station (ARS), high reliability-relay station (HR-RS), home NodeB (HNB), home eNodeB (HeNB), road side unit (RSU), radio remote head (RRH), transmission point (TP), transmission and reception point (TRP), or the like.

Each of the plurality of terminals 130-1, 130-2, 130-3, 130-4, 130-5, and 130-6 may be referred to as user equipment (UE), terminal equipment (TE), advanced mobile station (AMS), high reliability-mobile station (HR-MS), terminal, access terminal, mobile terminal, station, subscriber station, mobile station, portable subscriber station, node, device, on-board unit (OBU), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul link or a non-ideal backhaul link, and exchange information with each other via the ideal or non-ideal backhaul. Also, each of the plurality of base stations 110-1, 110-2, 110-3, 120-1, and 120-2 may be connected to the core network through the ideal backhaul link or non-ideal backhaul link. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support a multi-input multi-output (MIMO) transmission (e.g., single-user MIMO (SU-MIMO), multi-user MIMO (MU-MIMO), massive MIMO, or the like), a coordinated multipoint (CoMP) transmission, a carrier aggregation (CA) transmission, a transmission in unlicensed band, a device-to-device (D2D) communication (or, proximity services (ProSe)), an Internet of Things (IoT) communication, a dual connectivity (DC), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2). For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

Each of the first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Methods for transmitting and receiving signals in a communication system will be described. In particular, methods for a base station to schedule a data channel to a terminal for downlink and uplink transmission in a communication system, and methods for feeding back HARQ-ACK information for the data channel will be described. The following exemplary embodiments may be applied not only to the NR communication system but also to other communication systems (e.g., LTE communication system, fifth generation (5G) communication system, sixth generation (6G) communication system, or the like).

The NR communication system may support a wider system bandwidth (e.g., carrier bandwidth) than a system bandwidth provided by the LTE communication system in order to efficiently use a wide frequency band. For example, the maximum system bandwidth supported by the LTE communication system may be 20 MHz. On the other hand, the NR communication system may support a carrier bandwidth of up to 100 MHz in a frequency band of 6 GHz or below, and may support a carrier bandwidth of up to 400 MHz in a frequency band of 6 GHz or above.

A numerology applied to physical signals and channels in the communication system (e.g., NR communication system) may be variable. The numerology may vary to satisfy various technical requirements of the communication system. In the communication system to which a cyclic prefix (CP) based OFDM waveform technology is applied, the numerology may include a subcarrier spacing and a CP length (or CP type). Table 1 below may be a first exemplary embodiment of configuration of numerologies for the CP-based OFDM. The subcarrier spacings may have an exponential multiplication relationship of 2, and the CP length may be scaled at the same ratio as the OFDM symbol length. Depending on a frequency band in which the communication system operates, at least some numerologies among the numerologies of Table 1 may be supported. In addition, in the communication system, numerologies not listed in Table 1 may be further supported. CP type(s) not listed in Table 1 (e.g., extended CP) may be additionally supported for a specific subcarrier spacing (e.g., 60 kHz).

TABLE 1

| Subcarrier spacing | 15 kHz | 30 kHz | 60 kHz | 120 kHz | 240 kHz | 480 kHz |
|---|---|---|---|---|---|---|
| OFDM symbol length [μs] | 66.7 | 33.3 | 16.7 | 8.3 | 4.2 | 2.1 |
| CP length [μs] | 4.76 | 2.38 | 1.19 | 0.60 | 0.30 | 0.15 |
| Number of OFDM symbols within 1 ms | 14 | 28 | 56 | 112 | 224 | 448 |

In the following description, a frame structure in the communication system will be described. In the time domain, elements constituting a frame structure may include a subframe, slot, mini-slot, symbol, and the like. The subframe may be used as a unit for transmission, measurement, and the like, and the length of the subframe may have a fixed value (e.g., 1 ms) regardless of a subcarrier spacing. A slot may comprise consecutive symbols (e.g., 14 OFDM symbols). The length of the slot may be variable differently from the length of the subframe. For example, the length of the slot may be inversely proportional to the subcarrier spacing.

A slot may be used as a unit for transmission, measurement, scheduling, resource configuration, timing (e.g., scheduling timing, hybrid automatic repeat request (HARQ) timing, channel state information (CSI) measurement and reporting timing, etc.), and the like. The length of an actual time resource used for transmission, measurement, scheduling, resource configuration, etc. may not match the length of a slot. A mini-slot may include consecutive symbol(s), and the length of a mini-slot may be shorter than the length of a slot. A mini-slot may be used as a unit for transmission, measurement, scheduling, resource configuration, timing, and the like. A mini-slot (e.g., the length of a mini-slot, a mini-slot boundary, etc.) may be predefined in the technical specification. Alternatively, a mini-slot (e.g., the length of a mini-slot, a mini-slot boundary, etc.) may be configured (or indicated) to the terminal. When a specific condition is satisfied, use of a mini-slot may be configured (or indicated) to the terminal.

The base station may schedule a data channel (e.g., physical downlink shared channel (PDSCH), physical uplink shared channel (PUSCH), physical sidelink shared channel (PSSCH)) using some or all of symbols constituting a slot. In particular, for URLLC transmission, unlicensed band transmission, transmission in a situation where an NR communication system and an LTE communication system coexist, and multi-user scheduling based on analog beamforming, a data channel may be transmitted using a portion of a slot. In addition, the base station may schedule a data channel using a plurality of slots. In addition, the base station may schedule a data channel using at least one mini-slot.

In the frequency domain, elements constituting the frame structure may include a resource block (RB), subcarrier, and the like. One RB may include consecutive subcarriers (e.g., 12 subcarriers). The number of subcarriers constituting one RB may be constant regardless of a numerology. In this case, a bandwidth occupied by one RB may be proportional to a subcarrier spacing of a numerology. An RB may be used as a transmission and resource allocation unit for a data channel, control channel, and the like. Resource allocation of a data channel may be performed in units of RBs or RB groups (e.g., resource block group (RBG)). One RBG may include one or more consecutive RBs. Resource allocation of a control channel may be performed in units of control channel elements (CCEs). One CCE in the frequency domain may include one or more RBs.

In the NR communication system, a slot (e.g., slot format) may be composed of a combination of one or more of downlink period, flexible period (or unknown period), and an uplink period. Each of a downlink period, flexible period, and uplink period may be comprised of one or more consecutive symbols. A flexible period may be located between a downlink period and an uplink period, between a first downlink period and a second downlink period, or between a first uplink period and a second uplink period. When a flexible period is inserted between a downlink period and an uplink period, the flexible period may be used as a guard period.

A slot may include one or more flexible periods. Alternatively, a slot may not include a flexible period. The terminal may perform a predefined operation in a flexible period. Alternatively, the terminal may perform an operation configured by the base station semi-statically or periodically. For example, the periodic operation configured by the base station may include a PDCCH monitoring operation, synchronization signal/physical broadcast channel (SS/PBCH) block reception and measurement operation, channel state information-reference signal (CSI-RS) reception and measurement operation, downlink semi-persistent scheduling (SPS) PDSCH reception operation, sounding reference signal (SRS) transmission operation, physical random access channel (PRACH) transmission operation, periodically-configured PUCCH transmission operation, PUSCH transmission operation according to a configured grant, and the like. A flexible symbol may be overridden by a downlink symbol or an uplink symbol. When a flexible symbol is overridden by a downlink or uplink symbol, the terminal may perform a new operation instead of the existing operation in the corresponding flexible symbol (e.g., overridden flexible symbol).

A slot format may be configured semi-statically by higher layer signaling (e.g., radio resource control (RRC) signaling). Information indicating a semi-static slot format may be included in system information, and the semi-static slot format may be configured in a cell-specific manner. In addition, a semi-static slot format may be additionally configured for each terminal through terminal-specific higher layer signaling (e.g., RRC signaling). A flexible symbol of a slot format configured cell-specifically may be overridden by a downlink symbol or an uplink symbol by terminal-specific higher layer signaling. In addition, a slot format may be dynamically indicated by physical layer signaling (e.g., slot format indicator (SFI) included in downlink control information (DCI)). The semi-statically configured slot format may be overridden by a dynamically indicated slot format. For example, a semi-static flexible symbol may be overridden by a downlink symbol or an uplink symbol by SFI.

The terminal may perform downlink operations, uplink operations, and sidelink operations in a bandwidth part. A bandwidth part may be defined as a set of consecutive RBs (e.g., physical resource blocks (PRBs)) having a specific numerology in the frequency domain. RBs constituting one bandwidth part may be consecutive in the frequency domain. One numerology may be used for transmission of signals (e.g., transmission of control channel or data channel) in one bandwidth part. In exemplary embodiments, when used in a broad sense, a 'signal' may refer to any physical signal and channel. A terminal performing an initial access procedure may obtain configuration information of an initial bandwidth part from the base station through system information. A terminal operating in an RRC connected state may obtain the configuration information of the bandwidth part from the base station through terminal-specific higher layer signaling.

The configuration information of the bandwidth part may include a numerology (e.g., a subcarrier spacing and a CP length) applied to the bandwidth part. Also, the configuration information of the bandwidth part may further include information indicating a position of a start RB (e.g., start PRB) of the bandwidth part and information indicating the number of RBs (e.g., PRBs) constituting the bandwidth part. At least one bandwidth part among the bandwidth part(s) configured in the terminal may be activated. For example, within one carrier, one uplink bandwidth part and one downlink bandwidth part may be activated respectively. In a time division duplex (TDD) based communication system, a pair of an uplink bandwidth part and a downlink bandwidth part may be activated. The base station may configure a plurality of bandwidth parts to the terminal within one carrier, and may switch the active bandwidth part of the terminal.

In exemplary embodiments, "a frequency band (e.g., carrier, bandwidth part (BWP), RB set, listen before talk (LBT) subband, guard band, etc.) is activated" may mean a state in which a base station or terminal can transmit or receive a signal by using the frequency band (e.g., active frequency band). In addition, "a frequency band is activated" may mean a state in which a radio frequency (RF) filter (e.g., band pass filter) of a transceiver operates in a frequency band including the corresponding frequency band (i.e., active frequency band).

In exemplary embodiments, an RB may mean a common RB (CRB). Alternatively, an RB may mean a PRB or a virtual RB (VRB). In the NR communication system, a CRB may refer to an RB constituting a set of consecutive RBs (e.g., common RB grid) based on a reference frequency (e.g., point A). Carriers, bandwidth part, and the like may be arranged on the common RB grid. That is, a carrier, bandwidth part, etc. may be composed of CRB(s). An RB or CRB constituting a bandwidth part may be referred to as a PRB, and a CRB index within the bandwidth part may be appropriately converted into a PRB index. In an exemplary embodiment, an RB may refer to an interlace RB (IRB).

A PDCCH may be used to transmit a DCI or DCI format to a terminal. A minimum resource unit constituting a PDCCH may be a resource element group (REG). An REG may be composed of one PRB (e.g., 12 subcarriers) in the frequency domain and one OFDM symbol in the time domain. Thus, one REG may include 12 resource elements (REs). A demodulation reference signal (DMRS) for demodulating a PDCCH may be mapped to 3 REs among 12 REs constituting the REG, and control information (e.g., modulated DCI) may be mapped to the remaining 9 REs.

One PDCCH candidate may be composed of one CCE or aggregated CCEs. One CCE may be composed of a plurality of REGs. The NR communication system may support CCE aggregation levels 1, 2, 4, 8, 16, and the like, and one CCE may consist of six REGs.

A control resource set (CORESET) may be a resource region in which the terminal performs a blind decoding on PDCCHs. The CORESET may be composed of a plurality of REGs. The CORESET may consist of one or more PRBs in the frequency domain and one or more symbols (e.g., OFDM symbols) in the time domain. The symbols constituting one CORESET may be consecutive in the time domain. The PRBs constituting one CORESET may be consecutive or non-consecutive in the frequency domain. One DCI (e.g., one DCI format or one PDCCH) may be transmitted within one CORESET. A plurality of CORESETs may be configured with respect to a cell and a terminal, and the plurality of CORESETs may overlap in time-frequency resources.

A CORESET may be configured in the terminal by a PBCH (e.g., system information transmitted through the PBCH). The identifier (ID) of the CORESET configured by the PBCH may be 0. That is, the CORESET configured by the PBCH may be referred to as a CORESET #0. A terminal operating in an RRC idle state may perform a monitoring operation in the CORESET #0 in order to receive a first PDCCH in the initial access procedure. Not only terminals operating in the RRC idle state but also terminals operating in the RRC connected state may perform monitoring operations in the CORESET #0. The CORESET may be configured in the terminal by other system information (e.g., system information block type 1 (SIB1)) other than the system information transmitted through the PBCH. For example, for reception of a random access response (or Msg2) in a random access procedure, the terminal may receive the SIB1 including the configuration information of the CORESET. Also, the CORESET may be configured in the terminal by terminal-specific higher layer signaling (e.g., RRC signaling).

In each downlink bandwidth part, one or more CORESETs may be configured for the terminal. Here, "a CORESET is configured in a bandwidth part" may mean "the CORESET is logically associated with the bandwidth part, and the terminal monitors the CORESET in the bandwidth part". The initial downlink active bandwidth part may include the CORESET #0 and may be associated with the CORESET #0. The CORESET #0 having a quasi-co-location (QCL) relation with an SS/PBCH block may be configured for the terminal in a primary cell (PCell), a secondary cell (SCell), and a primary secondary cell (PSCell). In the secondary cell (SCell), the CORESET #0 may not be configured for the terminal.

A search space may be a set of candidate resource regions through which PDCCHs can be transmitted. The terminal may perform a blind decoding on each of the PDCCH candidates within a predefined search space. The terminal may determine whether a PDCCH is transmitted to itself by performing a cyclic redundancy check (CRC) on a result of the blind decoding. When it is determined that a PDCCH is a PDCCH for the terminal itself, the terminal may receive the PDCCH.

A PDCCH candidate may be configured with CCEs selected by a predefined hash function within an occasion of the CORESET or the search space. The search space may be defined and configured for each CCE aggregation level. In this case, a set of search spaces for all CCE aggregation levels may be referred to as a 'search space set'. In exemplary embodiments, 'search space' may mean 'search space set', and 'search space set' may mean 'search space'.

A search space set may be logically associated with one CORESET. One CORESET may be logically associated with one or more search space sets. A common search space set configured through a PBCH may be used to monitor a DCI scheduling a PDSCH for transmitting the SIB1. An ID of the common search space set configured through the PBCH may be set to 0. That is, the common search space set configured through the PBCH may be defined as a type 0 PDCCH common search space set or a search space set #0. The search space set #0 may be logically associated with the CORESET #0.

The search space set may be classified into a common search space set or a terminal-specific (i.e., UE-specific) search space set according to a purpose or a related operation. A common DCI may be transmitted in a common search space set, and a UE-specific DCI may be transmitted in a UE-specific search space set. Considering scheduling freedom and/or fallback transmission, a UE-specific DCI may be transmitted even in a common search space set. For example, a common DCI may include resource allocation information of a PDSCH for transmission of system information, paging, power control command, slot format indicator (SFI), preemption indicator, and the like. A UE-specific DCI may include resource allocation information of a PDSCH, resource allocation information of a PUSCH, and the like. A plurality of DCI formats may be defined according to a DCI payload, size, type of a radio network temporary identifier (RNTI), and the like.

In exemplary embodiments, a common search space may be referred to as a CSS, and a common search space set may be referred to as a CSS set. Also, in exemplary embodiments, a UE-specific search space may be referred to as a USS, and a UE-specific search space set may be referred to as a USS set.

A base station may transmit downlink transport block(s) (TB(s)) to a terminal on a PDSCH. The base station may transmit scheduling information of the PDSCH to the terminal, and the terminal may receive the PDSCH based on the scheduling information. The terminal may receive the downlink TB(s) included in the PDSCH. The downlink TB may include at least one among unicast data (e.g., downlink-shared channel (DL-SCH)), broadcast data, multicast data, and a higher layer control message (e.g., RRC message, medium access control (MAC) control element (CE), non-access stratum (NAS) message, etc.). For example, when the number of transmission layers of the PDSCH exceeds a reference value (e.g., 4 for the NR communication system, 1 for the LTE communication system), the PDSCH may include a plurality of TBs (e.g., two TBs). When the number of transmission layers of the PDSCH is less than or equal to the reference value, the PDSCH may include one TB. In addition, the terminal may receive a DCI (e.g., second DCI of 2-stage DCI) in a PDSCH resource region.

PDSCH scheduling may include scheduling by a dynamic grant and semi-persistent scheduling (SPS) by a configured grant. When PDSCH scheduling by a dynamic grant is used, a PDSCH may be dynamically scheduled by a DCI (e.g., scheduling DCI, DCI format 1_0, 1_1, 1_2, etc.). A CRC applied to a DCI for dynamic scheduling may be scrambled with a cell (C)-RNTI, MCS-C-RNTI, or the like. When SPS is used, the terminal may receive scheduling information of a PDSCH through RRC signaling and/or a DCI, and may periodically receive the PDSCH based on the scheduling information. In addition, a PDSCH reception operation of the terminal according to SPS may be activated or released by a DCI. A CRC applied to the DCI for SPS may be scrambled with a configured scheduling (CS)-RNTI, SPS-C-RNTI, or the like. The base station may transmit a PDSCH through every PDSCH resource. Alternatively, the base station may transmit the PDSCH in some PDSCH resources and may not transmit the PDSCH in some other PDSCH resources. A PDSCH by SPS may be referred to as an SPS PDSCH.

In exemplary embodiments below, it may be assumed that the number of transmission layers of a PDSCH is less than or equal to the reference value (e.g., when the PDSCH includes one TB), but exemplary embodiments of the present disclosure are not limited to the above-mentioned assumption, and they may be equally or similarly applied to a case where the PDSCH includes a plurality of TBs. In addition, although PDSCH scheduling will be mainly described in exemplary embodiments below, exemplary embodiments of the present disclosure may be equally or similarly applied not only to the PDSCH scheduling but also to scheduling of other data channels (e.g., PUSCH, PSSCH). Further, in exemplary embodiments below, unless otherwise stated, 'TB' and 'HARQ process' may be used interchangeably. For example, "a PDSCH includes a TB" or "a PDSCH corresponds to a TB" may mean that the PDSCH corresponds to the HARQ process.

A terminal may receive scheduling information of PDSCH(s) corresponding to one TB through one scheduling DCI. When repetitive PDSCH transmission is used, the above-described PDSCH(s) may be a plurality of PDSCHs. When repetitive PDSCH transmission is not used, the above-described PDSCH(s) may be one PDSCH. When SPS is used, PDSCH resource(s) corresponding to one TB may be allocated to the terminal within one SPS period, and the terminal may receive the PDSCH(s) corresponding to one TB. According to the above-described method, in order for the base station to schedule a plurality of TBs (or a plurality of HARQ processes) to the terminal, a plurality of PDSCHs may need to be scheduled by a plurality of DCIs, or a plurality of PDSCHs may need to be transmitted by using a plurality of SPS configurations.

[Multi-PDSCH Scheduling Method]

A terminal may perform a PDCCH monitoring operation with a long periodicity. For example, the terminal may monitor a PDCCH in every X-th slot. As X increases, a PDCCH monitoring complexity and power consumption of the terminal may be reduced. X may be a natural number. The above-described method may be useful in a transmission operation in a high frequency band. In particular, the above-described method may be useful in a transmission operation in a slot having a short duration due to a large subcarrier spacing (e.g., 480 kHz, 960 kHz). In addition, the PDCCH monitoring with a long periodicity may reduce DCI overhead. On the other hand, if a scheme of scheduling one TB through one DCI is used when X>1, the TB may be transmitted only in some slots, and downlink performance may be deteriorated according to this operation.

As a method for solving the above-described problem, the terminal may receive scheduling information of a plurality of TBs through one scheduling DCI, and may receive a plurality of PDSCHs corresponding to the plurality of TBs. In case of SPS, a plurality of PDSCH resources may be configured within one period through one SPS configuration, and the terminal may receive a plurality of PDSCHs corresponding to a plurality of TBs through the plurality of PDSCH resources within one period. A scheduling DCI may refer to a downlink DCI, DCI format 1_0, 1_1, 1_2, or the like. The method described above may be referred to as (Method 100). In (Method 100), each PDSCH or each TB may be transmitted within one slot. Alternatively, a certain PDSCH or a certain TB may be mapped to a plurality of slots and transmitted to the terminal.

Figure 3:
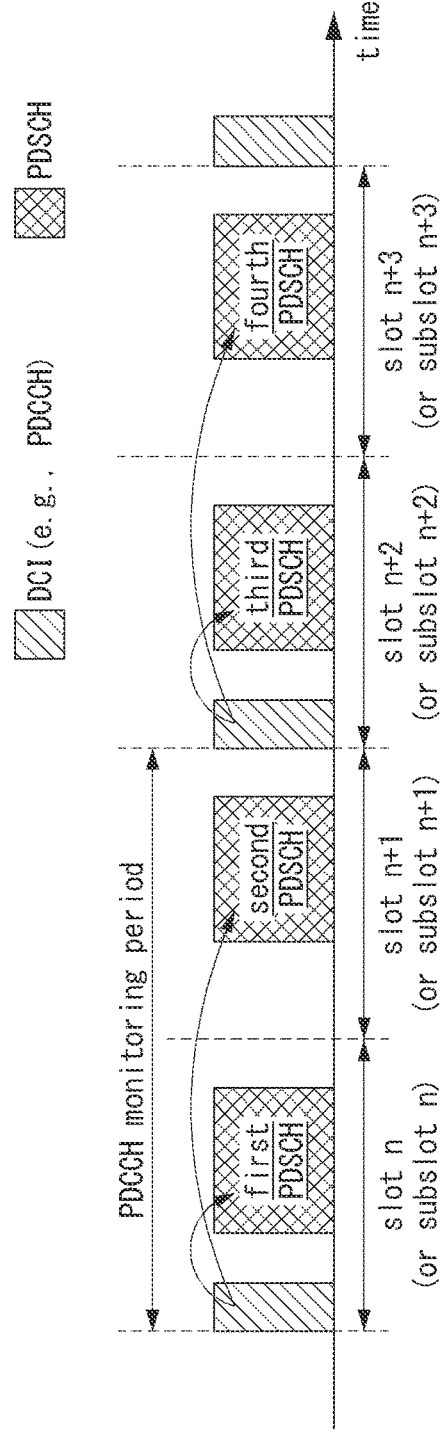
FIG. 3 is a conceptual diagram illustrating a first exemplary embodiment of a multi-PDSCH scheduling method.

FIG. 3 is a conceptual diagram illustrating a first exemplary embodiment of a multi-PDSCH scheduling method.

Referring to FIG. 3, a terminal may monitor a PDCCH (e.g., DCI) for downlink scheduling in every second slot. The terminal may receive scheduling information of a plurality of TBs within a plurality of slots through one DCI by (Method 100). The terminal may obtain scheduling information for a first PDSCH of a slot n and a second PDSCH of a slot n+1 through a DCI received in the slot n, and may obtain scheduling information for a third PDSCH of a slot n+2 and a fourth PDSCH of a slot n+3 through a DCI received in the slot n+2. The first PDSCH and the second PDSCH may include different TBs, and the third PDSCH and the fourth PDSCH may include different TBs. According to an exemplary embodiment, the terminal may receive a downlink TB in every slot even if PDCCH monitoring is omitted in some slots.

In (Method 100), when repetitive PDSCH transmission is not applied, the number of TBs scheduled by one DCI and the number of PDSCHs scheduled by the one DCI and may match, and the TB(s) and the PDSCH(s) may correspond one-to-one. When repetitive PDSCH transmission is applied, the number of PDSCHs scheduled by one DCI may be greater than the number of TBs scheduled by the one DCI, and one TB may correspond to a plurality of PDSCHs.

Resource allocation information of a PDSCH (PDSCH resource allocation information) may include time domain resource allocation information and frequency domain resource allocation information. The time domain resource allocation information of the PDSCH may include information on a start symbol of the PDSCH and a duration of the PDSCH (e.g., the number of symbols constituting the PDSCH). Each of the start symbol and the duration of the PDSCH may be expressed as an individual value. Alternatively, the start symbol and the duration of the PDSCH may be expressed by being converted into one value (e.g., start and length indicator value (SLIV)). In the following description, the 'start symbol and duration' and 'SLIV' may be used interchangeably. The terminal may interpret the start symbol of the PDSCH as an index of a symbol within a slot to which the PDSCH is mapped, or may interpret the start symbol of the PDSCH as an offset from one symbol (e.g., first symbol) of a DCI scheduling the PDSCH.

The PDSCH time domain resource allocation information may further include at least one information among a slot offset, a PDSCH mapping type, or the number of repeated PDSCH transmissions (or the number of aggregated slots for the PDSCH) in addition to the information on the start symbol and duration of the PDSCH. The slot offset may mean an offset between a slot in which the scheduling DCI is transmitted and a slot in which the PDSCH is transmitted. The slot offset may be denoted by K0. The PDSCH mapping type may indicate a type A or type B. In case of the PDSCH mapping type A, a DM-RS for demodulation of the PDSCH may be fixedly disposed in a specific symbol of the slot (e.g., the 3rd or 4th symbol of the slot). The fixed symbol position may be configured to the terminal through the PBCH. In case of the PDSCH mapping type B, the DM-RS for demodulation of the PDSCH may be disposed in one symbol (e.g., first symbol) among symbol(s) to which the PDSCH is allocated. However, in some exceptional cases, the DM-RS for demodulation of the PDSCH may not be disposed in one of the symbol(s) to which the PDSCH is allocated.

In (Method 100), a plurality of PDSCHs may have the same start symbol and duration. In this case, the same SLIV may be applied to the plurality of PDSCHs. The plurality of PDSCHs may be allocated to different slots. The terminal may obtain information of one SLIV through a DCI Alternatively, it may be allowed for a plurality of PDSCHs to have different start symbols and durations. That is, different SLIVs may be applied to a plurality of PDSCHs. In this case, a plurality of PDSCHs may be allocated to different slots or allocated to the same slot. The terminal may obtain information (e.g., indication) on a plurality of SLIVs through a DCI. Each SLIV may correspond to one PDSCH. For example, SLIV(s) and PDSCH(s) may correspond one-to-one regardless of whether the PDSCH(s) are repeatedly transmitted. The terminal may regard the number of SLIVs as the number of scheduled PDSCHs. Alternatively, each SLIV may correspond to one TB. In this case, one SLIV may correspond to one PDSCH or a plurality of PDSCHs depending on whether the PDSCH(s) are repeatedly transmitted.

The terminal may receive information on whether the above-described multi-PDSCH scheduling method is applied through a signaling procedure (e.g., RRC signaling procedure, specific RRC message, MAC CE, DCI) from the base station.

The PDSCH time domain resource allocation information may be transmitted to the terminal through higher layer signaling (e.g., RRC signaling) and/or a DCI. Candidate(s) for time domain resource allocation of the PDSCH may be configured to the terminal through higher layer signaling (e.g., RRC signaling). In exemplary embodiments below, a candidate may refer to a time domain resource allocation candidate. When there is one candidate (i.e., time domain resource allocation candidate), one piece of time domain resource allocation information may be applied to scheduling, and the scheduling DCI may not include information indicating time domain resource allocation information. On the other hand, when there are a plurality of candidates, one (or at least one) of the candidates may be applied to scheduling. The base station may select one (or at least one) among the candidates, and may perform a time domain resource allocation operation of the PDSCH based on the selected candidate(s). The terminal may receive information on the selected candidate(s) through a DCI, and may perform a PDSCH reception operation based on the selected candidate(s).

Table 2 may show a first exemplary embodiment of parameters for time domain resource allocation of the PDSCH. Each row or each entry in Table 2 may represent one time domain resource allocation candidate, and each column may represent an information element included in the time domain resource allocation information (e.g., time domain resource allocation candidate). The parameters of Table 2 may be configured through higher layer signaling (e.g., RRC signaling). For example, the base station may transmit configuration information of Table 2 to the terminal through RRC signaling, and the terminal may receive the configuration information of Table 2 from the base station. In an exemplary embodiment, the table (e.g., Table 2) configured by RRC signaling may be referred to as 'RC table', 'time resource table', or 'time resource list'.

TABLE 2

| Entry | Slot offset | PDSCH mapping type | First SLIV | Second SLIV | Third SLIV | Number of repeated transmissions | ... |
|---|---|---|---|---|---|---|---|
| 0 | 0 | type A | A1 | — | — | 1 | ... |
| 1 | 0 | type A | B1 | B2 | — | 1 | ... |
| 2 | 0 | type A | C1 | C2 | C3 | 1 | ... |

The time domain resource allocation candidate corresponding to each entry in the RRC table may include at least one of slot offset(s), PDSCH mapping type(s), SLIV(s), or the number of repeated transmissions (or the number of aggregated slots). The base station may select one (or at least one) entry from among the entry(ies) constituting the RRC table, and may indicate time domain resource allocation information corresponding to the selected entry(ies) to the terminal through a DCI.

When the multi-PDSCH scheduling method is used, an entry constituting the RRC table configured to the terminal may include a plurality of SLIVs. Referring to Table 2, the entry 1 including two SLIVs and the entry 2 including three SLIVs may be configured to the terminal. When the entry 1 or 2 is indicated through a DCI, the terminal may determine the positions of PDSCH resources based on two or three SLIVs, and may perform PDSCH reception operations at the determined positions. According to an exemplary embodiment, a plurality of entries constituting the same RRC table may include different numbers of SLIV(s). A plurality of entries constituting the same RRC table may include scheduling information of different numbers of TBs or different numbers of PDSCHs. The terminal may determine the number of TB(s) and/or the number of PDSCH(s) to receive based on the number of scheduled SLIV(s). The base station may dynamically change the number of TB(s) and/or the number of PDSCH(s) scheduled to the terminal by selectively applying a plurality of entries to the PDSCH scheduling.

When the single PDSCH scheduling method is used, an entry constituting the RRC table configured to the terminal may include one SLIV. Referring to Table 2, the entry 0 including one SLIV may be configured to the terminal. According to an exemplary embodiment, some entries among a plurality of entries constituting the same RRC table may include a plurality of SLIVs, and some other entries may include one SLIV. Among a plurality of entries constituting the same RRC table, some entries may include scheduling information for a plurality of TBs or a plurality of PDSCHs, and some other entries may include scheduling information for one TB or one PDSCH. The base station may dynamically select or switch between the single PDSCH scheduling method and the multi-PDSCH scheduling method by selectively applying a plurality of entries to the PDSCH scheduling. In an exemplary embodiment, the single PDSCH scheduling method may refer to a scheduling method to which multi-PDSCH scheduling is not applied. When the single PDSCH scheduling method is used, one DCI may schedule one TB. According to the single PDSCH scheduling method, one DCI may indicate one SLIV.

Referring to Table 2, an entry including a plurality of SLIVs in the RRC table may include one slot offset. One slot offset may be applied to a first scheduled PDSCH (e.g., a PDSCH corresponding to the first SLIV). An entry including a plurality of SLIVs may include one PDSCH mapping type. One PDSCH mapping type may be applied to all scheduled PDSCHs. According to another exemplary embodiment, an entry including a plurality of SLIVs in the RRC table may include a plurality of slot offsets and/or a plurality of PDSCH mapping types. The number of SLIVs and the number of slot offsets included in the respective entries may be the same, and each slot offset may be used to determine a slot of a PDSCH (or TB) corresponding to each SLIV. The number of SLIVs and the number of PDSCH mapping types included in the respective entries may be the same, and each PDSCH mapping type may be applied to a PDSCH (or TB) corresponding to each SLIV. According to the above method, scheduling flexibility can be increased. The above method may be particularly useful in a TDD system in which a downlink period and an uplink period are intersected.

In an exemplary embodiment, the maximum value of the number of SLIVs (or the maximum value of the number of TBs, the maximum value of the number of PDSCHs, etc.) that can be configured or indicated to the terminal through one DCI (or for SPS PDSCH transmission within one period) may be configured to the terminal or defined in the technical specifications. For example, information on the maximum value of the number of SLIVs may be transmitted to the terminal together with information for configuring the multi-PDSCH scheduling method to be applied to the terminal. The number of SLIVs (or the number of TBs, the number of PDSCHs) included in each entry of the RRC table may not exceed a preset maximum value.

Meanwhile, the interpretation reference of the sizes and/or values of fields of a DCI scheduling a PDSCH may be determined by the number of SLIVs, the number of TBs, and/or the number of PDSCHs scheduled by the corresponding DCI. For example, each of the number of RVs indicated by a redundancy version (RV) field and the number of NDIs indicated by a new data indicator (NDI) field may be the same as the number of SLIVs or the number of TBs scheduled by the same DCI. Alternatively, each of the number of RVs indicated by the RV field and the number of NDIs indicated by the NDI field may be determined by the number of SLIVs or the number of TBs scheduled by the same DCI. For another example, when a scheduling DCI indicates a plurality of SLIVs or schedules a plurality of TBs, a code block group transmission indicator (CBGTI) field may not exist in the corresponding scheduling DCI. Here, the size of the CBGTI field may be 0. When a scheduling DCI indicates one SLIV or schedules one TB, a CBGTI field may exist in the corresponding scheduling DCI. Here, the size of the CBGTI field may be 1 bit or more. The terminal may interpret the CBGTI field based on the above-described method, and may identify which CBG(s) a received PDSCH includes according to a result of the interpretation.

The terminal may identify at least one of the number of scheduled SLIVs, the number of TBs, and the number of PDSCHs by first interpreting a time domain resource assignment field of the DCI. The terminal may interpret the above-described fields (e.g., RV, NDI, CBGTI, etc.) based on a result of interpreting the time domain resource assignment field. In this case, the time domain resource assignment field of the DCI may have a fixed size and a fixed position in the payload of the DCI regardless of the number of scheduled SLIVs, the number of TBs, and/or the number of PDSCHs. As a method for supporting this operation, the time domain resource assignment field of the DCI may be mapped to bit(s) (e.g., bit(s) close to a most significant bit (MSB)) preceding the above fields (e.g., RV, NDI, CBGTI, etc.).

As another method, the interpretation reference of the sizes and/or values of fields of a DCI may be determined based on whether the multi-PDSCH scheduling method is applied (or configured) and/or the maximum value of the number of SLIVs (or the maximum value of the number of TBs, the maximum value of the number of PDSCHs) configured to the terminal. Alternatively, the interpretation reference of the sizes and/or values of the fields of the DCI may be determined based on the largest value among the number of SLIV(s), the number of TB(s), or the number of PDSCH(s) of the respective entries configured in the RRC table (e.g., Table 2) for time domain resource allocation.

For the single PDSCH scheduling and the multi-PDSCH scheduling, one DCI format (e.g., DCI formats 1_0, 1_1, 1_2, etc.) may be commonly used. The commonly used DCI format may be referred to as 'common DCI format'. In this case, the size of a DCI payload (hereinafter referred to as 'first payload') used for the multi-PDSCH scheduling may be different from the size of a DCI payload (hereinafter referred to as 'second payload') used for the single PDSCH scheduling. In this case, the size of the payload of the common DCI format may follow a larger size among the size of the first payload and the size of the second payload. The DCI payload may include DCI fields. Zero padding may be applied to a DCI payload having a smaller size among the DCI payloads (e.g., the first payload and the second payload), and the DCI payload sizes may be aligned based on the DCI payload having a larger size. According to the above-described method, the terminal may monitor a single DCI format (e.g., common DCI format) having a single size in order to receive multi-PDSCH scheduling information and single PDSCH scheduling information. The single DCI format may be transmitted and received using a common RNTI (e.g., C-RNTI, MCS-C-RNTI, CS-RNTI, etc.).

Alternatively, a DCI format (hereinafter, referred to as 'first DCI format') used for the multi-PDSCH scheduling may be different from a DCI format (hereinafter, referred to as 'second DCI format') used for the single PDSCH scheduling. In general, the size of the payload of the first DCI format and the size of the payload of the second DCI format may be different from each other. In this case, the PDCCH blind decoding complexity of the terminal may increase. To solve this problem, a procedure of aligning the payload size of the first DCI format with the payload size of the second DCI format may be performed. For example, by applying zero padding to a DCI format having a smaller payload among the DCI formats, the payload sizes of the DCI formats may be aligned. In this case, in order to distinguish the first DCI format from the second DCI format, the base station and the terminal may scramble CRCs of the first DCI format and the second DCI format by using different RNTIs. Alternatively, in order to distinguish the first DCI format from the second DCI format, an indicator or field for identifying the DCI format (e.g., an indicator or field indicating the first DCI format or the second DCI format) may be included in the first DCI format and the second DCI format. The indicator or field may be mapped to bit(s) of the same position in the DCI payload received by the terminal regardless of the DCI format.

The terminal may receive one or a plurality of PDSCHs (e.g., one or a plurality of unicast PDSCHs) within one slot. A plurality of PDSCHs may not overlap each other in the time domain. Alternatively, the terminal may receive at most one PDSCH (e.g., at most one unicast PDSCH) within one slot. The maximum number of PDSCHs (e.g., unicast PDSCHs) that the terminal can receive within one slot may be defined as the capability of the terminal, and the terminal may report the capability to the base station. That is, the capability of the terminal may include information indicating the maximum number of PDSCHs that can be received within one slot. The capability (e.g., the maximum number of PDSCHs that can be received within one slot) may be different according to a numerology (e.g., subcarrier spacing) or frequency band, and the terminal may report the capability to the base station for each numerology (e.g., subcarrier spacing) or each frequency band. For example, the maximum number of receivable PDSCHs per slot may be smaller when a shorter slot duration is used (e.g., when a larger subcarrier spacing is used) or in a higher frequency band. In exemplary embodiments, 'unicast PDSCH', 'PDSCH scheduled specifically for a terminal', 'PDSCH including TB(s)', 'PDSCH including a DL-SCH', and 'PDSCH scheduled by a DCI having a CRC scrambled by at least one of C-RNTI, MCS-C-RNTI, or CS-RNTI' may be used interchangeably.

In (Method 100), at most one PDSCH may be scheduled within one slot. A plurality of PDSCHs may be allocated to consecutive slots. For example, a first slot to which a first PDSCH is allocated may be indicated or configured to the terminal, and PDSCHs after the first PDSCH may be allocated to consecutive slots after the first slot. Alternatively, a plurality of PDSCHs may be allocated to consecutive or non-consecutive slots. For example, a slot to which each PDSCH is allocated may be indicated or configured to the terminal. For another example, the slot to which the first PDSCH is allocated may be indicated or configured to the terminal, and a slot distance (e.g., slot offset) between slots to which the PDSCHs are allocated may be indicated or configured to the terminal. This operation may be referred to as (Method 110). In (Method 110), each SLIV may be used to determine symbol(s) to which a PDSCH is mapped within each slot.

Alternatively, it may be allowed to allocate a plurality of PDSCHs to one slot. The total number of slots in which PDSCHs are scheduled may be equal to or greater than 1. This operation may be referred to as (Method 120). In (Method 120), each SLIV may be used to determine symbol(s) to which each PDSCH is mapped. Alternatively, each SLIV may be used to determine symbol(s) to which a specific PDSCH (e.g., the first PDSCH in each slot) is mapped within each slot. When a plurality of PDSCHs are allocated to one slot, symbol(s) to which the remaining PDSCH(s) other than the specific PDSCH (e.g., the first PDSCH) are mapped may be determined based on a position of time resource(s) of the previous PDSCH(s) in the same slot. For example, a plurality of PDSCHs scheduled within one slot may be consecutive in the time domain, and a start symbol of subsequent PDSCH(s) may be determined as a symbol next to the last symbol of the immediately preceding PDSCH. A plurality of PDSCHs scheduled within one slot may have the same duration (i.e., number of symbols). The base station may determine whether to apply (Method 110) or (Method 120) to the terminal based on the capability reported by the terminal. The base station may transmit information indicating application of (Method 110) or (Method 120) to the terminal. The terminal may apply (Method 110) or (Method 120) according to the indication of the base station.

Figure 4:
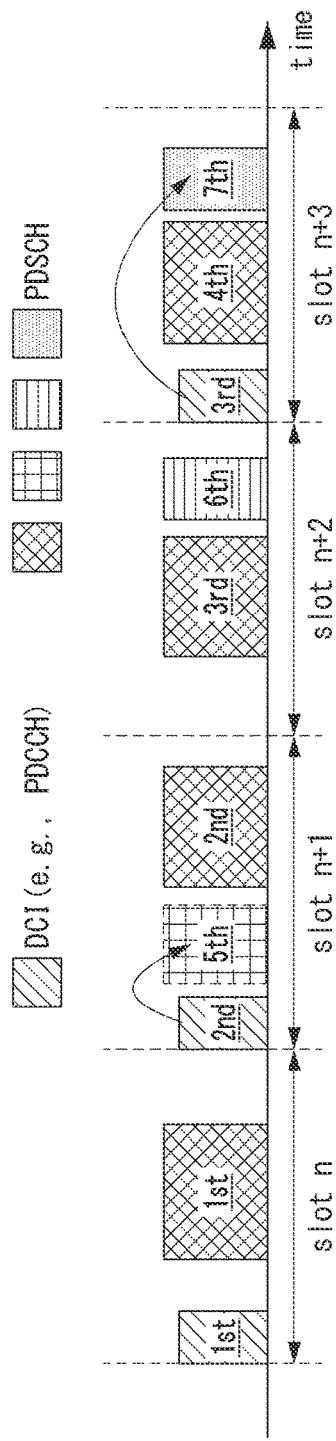
FIG. 4 is a conceptual diagram illustrating a first exemplary embodiment of a multi-PDSCH scheduling method in consideration of scheduling constraints.

FIG. 4 is a conceptual diagram illustrating a first exemplary embodiment of a multi-PDSCH scheduling method in consideration of scheduling constraints.

Referring to FIG. 4, a terminal may obtain scheduling information for first to fourth PDSCHs in slots n to n+3 through a first DCI (e.g., first PDCCH) received in the slot n. The plurality of PDSCHs may be allocated to consecutive slots. The plurality of PDSCHs may include a plurality of different TBs. Symbol(s) to which each PDSCH is mapped within a slot may be indicated by each SLIV of the first DCI.

The terminal may obtain scheduling information of the PDSCH(s) through a DCI (e.g., second DCI) different from the first DCI. In this case, the PDSCH(s) scheduled by the second DCI may be allocated to a period earlier than a start PDSCH (e.g., the start symbol of the first PDSCH) scheduled by the first DCI, or to a period later than a last PDSCH (e.g., the end symbol of the fourth PDSCH) scheduled by the first DCI. The PDSCH(s) scheduled by the second DCI may not be allocated to periods other than the aforementioned periods. For example, the PDSCH(s) scheduled by the second DCI may not be allocated to a period between the PDSCHs scheduled by the first DCI. In this case, the second DCI may be a DCI transmitted later than the first DCI. Specifically, the above-described method may be applied when the end symbol of the first DCI precedes the end symbol of the second DCI, when the start symbol of the first DCI precedes the start symbol of the second DCI, or when the end symbol of the first DCI precedes the start symbol of the second DCI. The above-described method may be applied to general PDSCH scheduling.

According to an exemplary embodiment, the terminal may not expect to obtain scheduling information of a fifth PDSCH located between the first PDSCH and the second PDSCH through the second DCI in the slot n+1. If the second DCI for scheduling such the fifth PDSCH is received, the terminal may consider that such the PDSCH scheduling indication by the second DCI is incorrect, and may not receive the fifth PDSCH scheduled by the second DCI. In addition, the terminal may consider that indications (e.g., CSI request, SRS request, etc.) included in the second DCI other than the PDSCH scheduling indication are also incorrect, and may not follow the indications. Alternatively, the terminal may consider indications (e.g., CSI request, SRS request, etc.) included in the second DCI other than the PDSCH scheduling indication as valid, and may perform operations according to the indications. When the second DCI is received, the terminal may not receive the fifth PDSCH and may not receive also some of the PDSCHs scheduled by the first DCI. For example, the terminal may not receive PDSCHs allocated after the fifth PDSCH among the PDSCHs scheduled by the first DCI.

In the above-described exemplary embodiment, the terminal may receive a scheduling indication of a sixth PDSCH located between the third PDSCH and the fourth PDSCH in the slot n+2. The sixth PDSCH may be a PDSCH by SPS. In addition, the terminal may receive a scheduling indication of a seventh PDSCH after the fourth PDSCH in the slot n+3. According to the above-described method, the scheduling indication of the seventh PDSCH may be considered valid, and the terminal may perform a reception operation for the seventh PDSCH according to the scheduling indication. Here, the scheduling indication of the sixth PDSCH may be considered invalid.

In the exemplary embodiment described above, the PDSCHs may be unicast PDSCHs. The above-described method may be applied to a terminal to which scheduling of at most one PDSCH (e.g., at most one unicast PDSCH) can be indicated or configured within one slot. Alternatively, the above-described method may be applied to a terminal to which scheduling of a plurality of PDSCHs (e.g., a plurality of unicast PDSCHs) can be indicated or configured within one slot.

[HARQ Feedback Method]

HARQ may be applied to PDSCH transmission. A terminal may feedback HARQ-ACK information, which is a result of receiving a scheduled PDSCH, to a base station, and the base station may determine whether to retransmit the PDSCH for a corresponding TB based on the HARQ-ACK information. When the terminal successfully receives the PDSCH (e.g., TB), the HARQ-ACK information corresponding to the TB may indicate ACK. When the terminal does not successfully receive the PDSCH (e.g., TB), the HARQ-ACK information corresponding to the TB may indicate negative ACK (NACK). In addition, a certain PDSCH (e.g., a corresponding TB) scheduled for the terminal may not be transmitted when a predetermined condition is satisfied (e.g., transmission may be omitted). In this case, the HARQ-ACK information corresponding to the TB may indicate NACK. The certain PDSCH (e.g., TB) may be one PDSCH (e.g., one TB) among a plurality of PDSCHs (e.g., a plurality of TBs) scheduled by a single DCI. For example, the certain PDSCH (e.g., TB) may overlap an uplink symbol, and the base station may omit transmission of the certain PDSCH (e.g., TB). The HARQ-ACK information may indicate only ACK or only NACK. Alternatively, the HARQ-ACK information may indicate ACK or NACK. In an exemplary embodiment, 'HARQ-ACK information', 'HARQ-ACK bit', 'HARQ-ACK response', 'HARQ-ACK feedback', and 'HARQ-ACK' may be used with the same meaning. The size of HARQ-ACK information corresponding to each downlink TB may be 1 bit. A CBG-based HARQ transmission scheme may be used, and one TB may consist of N CBG(s). N may be a natural number. In this case, N-bit HARQ-ACK information may correspond to each downlink TB. In exemplary embodiments below, unless otherwise stated, it may be assumed that HARQ-ACK feedback for each TB is performed, and that HARQ-ACK information of 1 bit corresponds to one downlink TB.

The terminal may receive, from the base station, an indication or configuration of an uplink resource (e.g., PUCCH resource, PUSCH resource, SRS resource, etc.) for transmitting HARQ-ACK (e.g., HARQ-ACK information). The terminal may receive, from the base station, an indication or configuration of a time distance (hereinafter referred to as 'HARQ-ACK timing') from a reception timing of a PDSCH to a transmission timing of a HARQ-ACK for the PDSCH, and may determine a feedback timing of the HARQ-ACK based on the HARQ-ACK timing. Information on the HARQ-ACK timing may be included in a DCI or SPS configuration information for scheduling PDSCH(s). Each of the PDSCH reception timing and the HARQ-ACK feedback timing may refer to a slot, a subslot, a mini-slot, or a symbol including the corresponding timing. The HARQ-ACK timing may refer to a slot offset, a subslot offset, a mini-slot offset, or a symbol offset between the PDSCH reception timing and the HARQ-ACK feedback timing. The slot, subslot, mini-slot, or symbol may be a slot, subslot, mini-slot, or symbol of an uplink BWP. Alternatively, the slot, subslot, mini-slot, or symbol may be a slot, subslot, mini-slot, or symbol of a downlink BWP. The HARQ-ACK timing may be denoted by K1.

A sub slot may refer to a unit of time shorter than a slot, and may be used as a unit for a transmission/reception operation, measurement operation, and/or timing determination operation. The number of symbols constituting a subslot may be one of divisor(s) of the number of symbols constituting a slot. For example, when one slot includes 14 symbols, the number of symbols included in one subslot may be 1, 2, 4, or 7. The subslots may be disposed consecutively in the time domain. In exemplary embodiments below, a case in which the PDSCH scheduling operation and the HARQ feedback operation are performed in units of slots will be mainly described, but proposed methods may be applied in the same or similar manner even when the PDSCH scheduling operation and the HARQ feedback operation are performed in units of subslots. In exemplary embodiment, by interpreting 'slot' as 'subslot', the operations in units of subslots may be understood.

The terminal may generate a HARQ-ACK codebook including HARQ-ACK information of a PDSCH, and may report the HARQ-ACK codebook to the base station. The PDSCH may be a PDSCH by a dynamic grant or an SPS PDSCH. The HARQ-ACK codebook may include a HARQ-ACK for a DCI indicating release of an SPS PDSCH. The type of the HARQ-ACK codebook may be one of a HARQ-ACK codebook having a semi-static size (hereinafter referred to as 'type 1 HARQ-ACK codebook'), a HARQ-ACK codebook having a dynamic size (hereinafter referred to as 'type 2 HARQ-ACK codebook'), and a HARQ-ACK codebook for feeding back HARQ-ACK(s) for multiple (e.g., all) downlink HARQ process(es) at once (hereinafter, 'type 3 HARQ-ACK codebook'). Each downlink HARQ-ACK may be mapped to each bit constituting the payload of the HARQ-ACK codebook. The size of the HARQ-ACK codebook may be 1 or more. The HARQ-ACK codebook may be transmitted to the base station through an uplink signal or channel (e.g., PUCCH, PUSCH, SRS, etc.).

In case of multi-PDSCH scheduling, the terminal may obtain scheduling information of a plurality of downlink TBs through one DCI, and may report a plurality of HARQ-ACKs corresponding to the plurality of downlink TBs to the base station. In case of SPS, a plurality of downlink TBs may be transmitted within one SPS configuration and one SPS period, and the terminal may report a plurality of HARQ-ACKs corresponding to the plurality of downlink TBs to the base station. In this case, the plurality of HARQ-ACKs corresponding to the plurality of TBs may be included in the same HARQ-ACK codebook, and the terminal may report the HARQ-ACK codebook to the base station. The plurality of HARQ-ACKs may be transmitted to the base station at the same timing, and may be transmitted to the base station through the same uplink resource (e.g., PUCCH, PUSCH, SRS, etc.). In this case, the HARQ-ACK timing may be defined as a distance between a transmission timing of one of the plurality of PDSCHs corresponding to the plurality of TBs (e.g., a last transmitted PDSCH, a PDSCH corresponding to the last TB) and a HARQ-ACK feedback timing. The method described above may be referred to as (Method 200).

Figure 5:
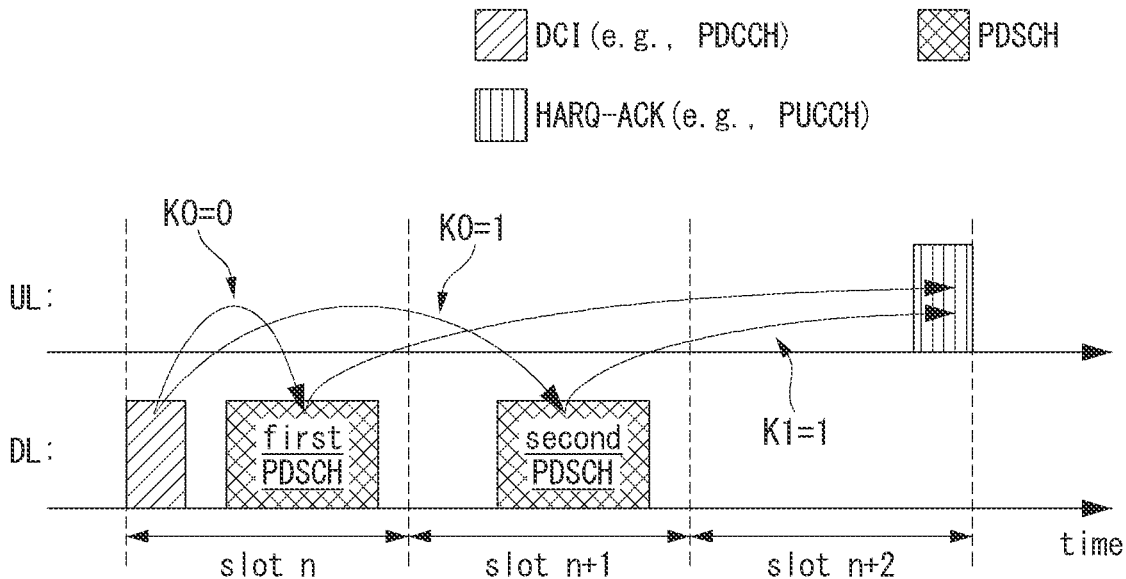
FIG. 5 is a conceptual diagram illustrating a first exemplary embodiment of a HARQ-ACK feedback method for multi-PDSCH scheduling.

FIG. 5 is a conceptual diagram illustrating a first exemplary embodiment of a HARQ-ACK feedback method for multi-PDSCH scheduling.

Referring to FIG. 5, a terminal may receive a DCI in a slot n, and the DCI may include scheduling information of a first PDSCH in the slot n and scheduling information of a second PDSCH in a slot n+1. A slot offset K0 for the first PDSCH may be 0, and a slot offset K0 for the second PDSCH may be 1. The first PDSCH may include a first TB, and the second PDSCH may include a second TB. The first TB and the second TB may be different from each other.

According to (Method 200), a HARQ-ACK for the first TB and a HARQ-ACK for the second TB may be included in the same HARQ-ACK codebook, and transmitted to a base station uplink through an uplink resource (e.g., PUCCH) at the same timing (e.g., slot n+2). For this operation, the terminal may obtain 'HARQ-ACK timing (K1)=1' through the DCI. Based on K1=1, the terminal may interpret that a slot distance between a reception slot of the last PDSCH (e.g., the second PDSCH) among the plurality of PDSCHs and a transmission slot of the HARQ-ACK codebook is 1.

According to (Method 200), the terminal may perform one HARQ-ACK feedback operation for a plurality of scheduled TBs, and may receive one HARQ-ACK timing for the one HARQ-ACK feedback operation from the base station. Accordingly, an uplink signaling overhead for the HARQ-ACK feedback and a downlink signaling overhead for the HARQ-ACK timing indication may be reduced. When the transmission timing of the HARQ-ACKs is determined based on the reception timing of the latest TB, a delay time of downlink transmission may increase.

As a method for solving the above-mentioned problem, each of the plurality of HARQ-ACKs corresponding to the plurality of TBs may be included in a different HARQ-ACK codebook, and the terminal may report the different HARQ-ACK codebooks to the base station. For example, the first HARQ-ACK corresponding to the first TB may be included in a first HARQ-ACK codebook, and the second HARQ-ACK corresponding to the second TB may be included in a second HARQ-ACK codebook. The first HARQ-ACK codebook may be the same as the second HARQ-ACK codebook. Alternatively, the first HARQ-ACK codebook may be different from the second HARQ-ACK codebook. Each of the plurality of HARQ-ACKs may be transmitted to the base station at a different timing, and may be transmitted to the base station through a different uplink resource (e.g., PUCCH, PUSCH, SRS, etc.). For example, the first HARQ-ACK codebook may be transmitted through a first uplink resource at a first timing, and the second HARQ-ACK codebook may be transmitted through a second uplink resource at a second timing. The first timing may be the same as the second timing. Alternatively, the first timing may be different from the second timing. The first uplink resource may be the same as the second uplink resource. Alternatively, the first uplink resource may be different from the second uplink resource. The method described above may be referred to as (Method 210).

Figure 6A:
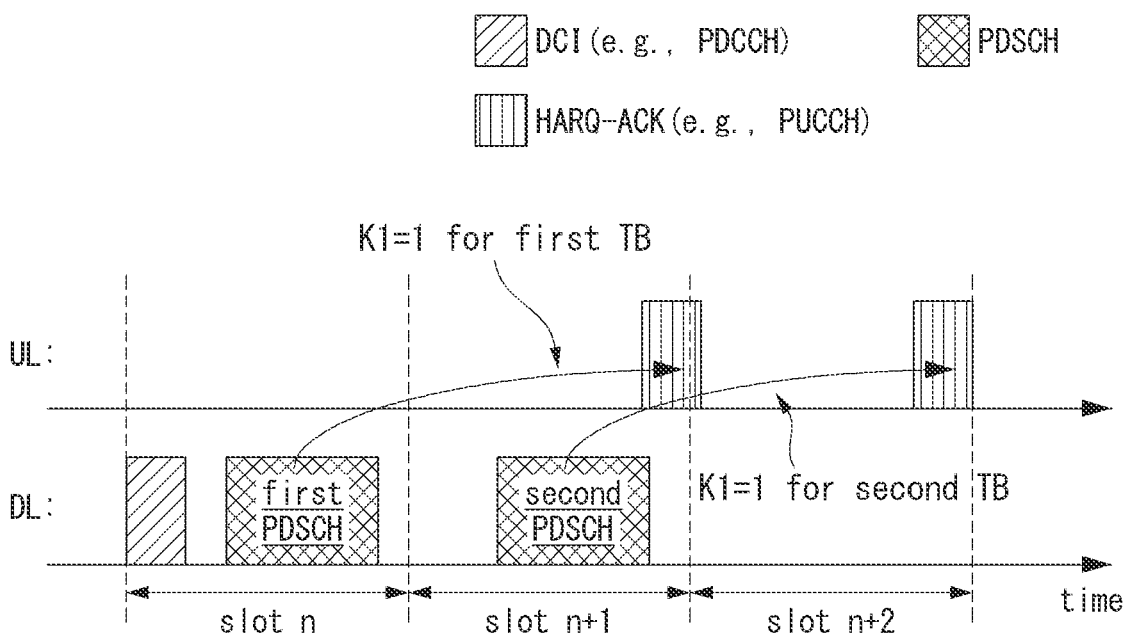
FIG. 6A is a conceptual diagram illustrating a second exemplary embodiment of a HARQ-ACK feedback method for multi-PDSCH scheduling.
Figure 6B:
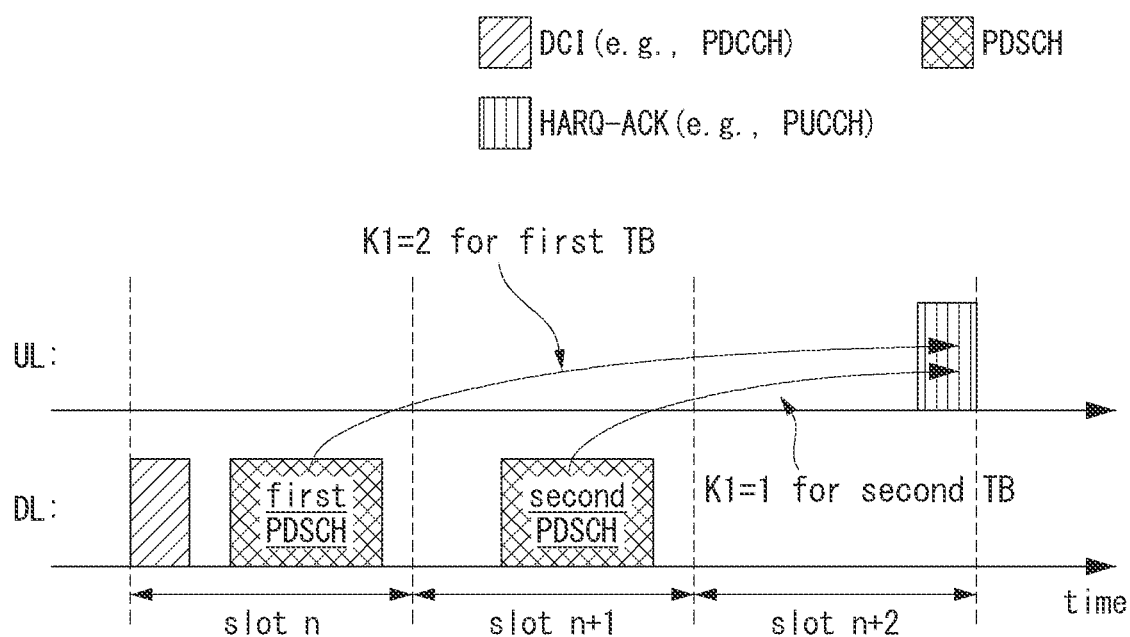
FIG. 6B is a conceptual diagram illustrating a third exemplary embodiment of a HARQ-ACK feedback method for multi-PDSCH scheduling.

FIG. 6A is a conceptual diagram illustrating a second exemplary embodiment of a HARQ-ACK feedback method for multi-PDSCH scheduling, and FIG. 6B is a conceptual diagram illustrating a third exemplary embodiment of a HARQ-ACK feedback method for multi-PDSCH scheduling.

Referring to FIGS. 6A and 6B, a terminal may receive a DCI in a slot n, and may obtain scheduling information of a first PDSCH in the slot n and scheduling information of a second PDSCH in a slot n+1 through the DCI. A slot offset for the first PDSCH may be 0, and a slot offset for the second PDSCH may be 1. The first PDSCH may include a first TB, and the second PDSCH may include a second TB. The first TB and the second TB may be different from each other.

The exemplary embodiments may be performed by (Method 210). Referring to FIG. 6A, HARQ-ACKs for the first TB and the second TB may be included in different HARQ-ACK codebooks, and the different HARQ-ACK codebooks may be reported to a base station at different timings. For example, the HARQ-ACK for the first TB may be transmitted to the base station in the slot n+1, and the HARQ-ACK for the second TB may be transmitted to the base station in a slot n+2. Referring to FIG. 6B, the HARQ-ACKs for the first TB and the second TB may be included in the same HARQ-ACK codebook, and the same HARQ-ACK codebook may be reported to the base station at the same timing. For example, both the HARQ-ACKs for the first TB and the second TB may be transmitted to the base station in the slot n+2.

In the above-described exemplary embodiment, the terminal may receive an indication or configuration of one HARQ-ACK timing from the base station. One HARQ-ACK timing may be equally applied to each of a plurality of TBs (or a plurality of PDSCHs) scheduled by the DCI, and a HARQ-ACK feedback timing derived by the one HARQ-ACK timing may be different for each TB (e.g., each PDSCH). Referring to FIG. 6A, the terminal may receive information on a HARQ-ACK timing (e.g., K1=1) commonly applied to the first TB and the second TB from the base station, and determine the HARQ-ACK feedback timings of the first TB and the second TB based on the HARQ-ACK timing.

Alternatively, the terminal may receive an indication or configuration of a plurality of HARQ-ACK timings from the base station. Each of the plurality of HARQ-ACK timings may be applied to each TB (e.g., each PDSCH) scheduled by the DCI, and HARQ-ACK feedback timings for the TBs (e.g., PDSCHs), which are derived by the plurality of HARQ-ACK timings, may be the same or different from each other. Referring to FIG. 6B, the terminal may receive information on a HARQ-ACK timing (K1=2) for the first TB and a HARQ-ACK timing (K1=1) for the second TB from the base station, and may determine the HARQ-ACK feedback timings of the first TB and the second TB based on the HARQ-ACK timings. Referring to FIG. 6A, the terminal may receive information on a HARQ-ACK timing (K1=1) for the first TB and a HARQ-ACK timing (K1=1) for the second TB from the base station, and may determine the HARQ-ACK feedback timings of the first TB and the second TB based on the HARQ-ACK timings. In this case, if the HARQ-ACK feedback timings for the plurality of TBs (e.g., the first TB and the second TB) are the same, the HARQ-ACKs for the plurality of TBs may be included in the same HARQ-ACK codebook.

In (Method 210), the terminal may receive an indication or configuration of a plurality of uplink resources (e.g., PUCCH, PUSCH, SRS, etc.) for transmitting the plurality of HARQ-ACKs. For example, the terminal may receive an indication or configuration of a first PUCCH resource for transmitting the HARQ-ACK for the first TB and a second PUCCH resource for transmitting the HARQ-ACK for the second TB through the DCI for scheduling the PDSCH(s). The transmission timings of the first PUCCH and the second PUCCH may follow the HARQ-ACK feedback timings determined by the above-described method. When the transmission timings (e.g., slots, subslots) of the first PUCCH and the second PUCCH are the same, HARQ-ACKs for the first TB and the second TB may be included in the same HARQ-ACK codebook, and the same HARQ-ACK codebook may be transmitted through one uplink resource. The one uplink resource may be the first PUCCH or the second PUCCH. Alternatively, the one uplink resource may be a signal or channel (e.g., PUSCH, SRS, third PUCCH, etc.) other than the first PUCCH and the second PUCCH.

The information on the above-described HARQ-ACK timing(s) and information on the above-described PUCCH resource(s) may be included in the DCI for scheduling the corresponding TBs, and the DCI may be transmitted to the terminal. Alternatively, the information on the above-described HARQ-ACK timing(s) and information on the above-described PUCCH resource(s) may be semi-statically configured to the terminal through higher layer signaling (e.g., RRC signaling, SPS configuration message).

[Type 2 HARQ-ACK Codebook]

When a type 2 HARQ-ACK codebook is used, a terminal may map HARQ-ACK(s) for TB(s) scheduled through DCI(s) to bit(s) in the HARQ-ACK codebook. When multi-PDSCH scheduling method is used, one DCI may correspond to one or more bit(s) in the HARQ-ACK codebook. When HARQ-ACKs corresponding to a plurality of DCIs are included in one HARQ-ACK codebook, the order in which the HARQ-ACKs corresponding to the plurality of DCIs are mapped to a payload of the HARQ-ACK codebook may be determined according to time resources (e.g., start symbols) of PDCCH monitoring occasions (or, CORESETs or search space sets) or serving cells in which the DCIs are transmitted. For example, indexing for PDCCH monitoring occasions having the same start symbols among PDCCH monitoring occasions corresponding to the same HARQ-ACK codebook may be performed in ascending order (or descending order) of cell IDs (e.g., physical layer cell IDs, IDs additionally assigned according to higher layer configuration) of the serving cells, and then indexing for the PDCCH monitoring occasions may be performed in a temporal order of the start symbols of the PDCCH monitoring occasions. The HARQ-ACKs corresponding to the DCIs may be mapped to the HARQ-ACK codebook in the order of the indexing. The base station may transmit a DCI (e.g., DCI format) through at most one PDCCH monitoring occasion in each start symbol and each serving cell. The mapping order of the HARQ-ACKs may be determined by further considering positions of time resources (e.g., start symbols) of the PDSCHs corresponding to the HARQ-ACKs.

Specifically, K HARQ-ACK(s) for K TB(s) scheduled through a certain DCI may be mapped to K bit(s) in the HARQ-ACK codebook. K may be a natural number. Alternatively, M HARQ-ACK(s) for M TB(s) among L TB(s) scheduled through a certain DCI may be mapped to M bit(s) in the HARQ-ACK codebook. L may be a natural number, and M may be a natural number less than or equal to L. The size of the HARQ-ACK codebook may be determined by the number of TB(s) that the base station actually schedules to the terminal through the DCI. This operation may be referred to as (Method 220).

On the other hand, the type 2 HARQ-ACK codebook may include not only HARQ-ACK(s) corresponding to DCI(s) successfully received by the terminal, but also HARQ-ACK(s) corresponding to DCI(s) not received by the terminal but estimated to have been transmitted by the base station. According to the above-described PDSCH scheduling method, the number of TBs (e.g., PDSCHs) scheduled by a DCI may be dynamically changed. In this case, it may be difficult for the terminal to know the number of TB(s) (e.g., PDSCH(s)) scheduled by a DCI, which are not received but are estimated to have been transmitted by the base station. Therefore, when (Method 220) is used, it may be difficult for the terminal to estimate the size of the HARQ-ACK codebook when some DCI(s) are missed. As a result, the size of the HARQ-ACK codebook, which is estimated by the terminal, may be different from the size of the HARQ-ACK codebook, which is assumed by the base station (e.g., a receiver of the base station), and transmission of the HARQ-ACK codebook may fail.

As a method for solving the above problem, with respect to a first DCI and a second DCI corresponding to the same HARQ-ACK codebook, information on the number of TBs (or PDSCHs) scheduled by the first DCI may be transmitted to the terminal as being included in the second DCI. For example, when the first DCI is transmitted first and the second DCI is transmitted later, the second DCI may include information on the number of TBs scheduled by the first DCI. Considering the above-mentioned indexing rule, the above-described operation may be generalized as follows. "When the first DCI is transmitted in a PDCCH monitoring occasion having a lower index and the second DCI is transmitted in a PDCCH monitoring occasion having a higher index", the second DCI may include information on the number of TBs scheduled by the first DCI. Further, the second DCI may include information on whether the first DCI has actually been transmitted (e.g., downlink assignment index (DAI), counter DAI (C-DAI), total-DAI (T-DAI)). According to this, even when the terminal misses the first DCI and receives the second DCI, the terminal may correctly generate the HARQ-ACK codebook in consideration of a payload of the HARQ-ACK codebook corresponding to the first DCI. The information on the number of TBs (or PDSCHs) scheduled by the second DCI may be included in the first DCI and transmitted to the terminal. That is, each of the plurality of DCIs may include information on the number of TBs scheduled by the counterpart DCI. The first DCI may include information (e.g., DAI, C-DAI, T-DAI) on whether the second DCI has actually been transmitted. In this case, the terminal may correctly generate the HARQ-ACK codebook even when the first DCI is received and the second DCI is missed. The above-described method may be equally applied to three or more DCIs corresponding to the same HARQ-ACK codebook. The method described above may be referred to as (Method 230).

As another method for solving the above problem, for the DCI(s) corresponding to the HARQ-ACK codebook, the number (hereinafter, 'B') of bits which HARQ-ACK(s) corresponding to each DCI (or PDCCH monitoring occasion corresponding to each DCI) occupy in the HARQ codebook may be constant regardless of the number of TB(s) that are actually scheduled through each DCI. That is, when the number of DCI(s) corresponding to a certain HARQ-ACK codebook is A, the size of the corresponding HARQ-ACK codebook may be given as A×B. B may be a value associated with the number of TBs that can be scheduled by one DCI. For example, B may be determined as the maximum value of the number of TBs that can be scheduled by one DCI. As described above, the maximum value of the number of TBs per DCI may be configured to the terminal. As another example, B may be determined as the largest value among the number(s) of TBs scheduled by entry(ies) of the RRC table (e.g., Table 2) configured to the terminal. Referring back to Table 2, one TB may be scheduled by the entry 0, two TBs may be scheduled through the entry 1, and three TBs may be scheduled by the entry 2. In this case, according to the above-described method, B may be 3. The method described above may be referred to as (Method 240). (Method 240) may be applied to generation and transmission of each HARQ-ACK codebook.

Each DCI may schedule up to B TB(s). For example, a certain DCI may schedule C TB(s). C may be a natural number less than or equal to B. In this case, HARQ-ACK(s) corresponding to C TB(s) may be mapped to C bit(s) among B bits corresponding to the corresponding DCI within the HARQ-ACK codebook. When C<B, HARQ-ACK(s) may not be mapped to the remaining (B-C) bits corresponding to the DCI within the HARQ-ACK codebook. The terminal may set the remaining (B-C) bits in the HARQ-ACK codebook to a value (e.g., '0' or '1') agreed in advance with the base station. Alternatively, the terminal may map ACK to the remaining (B-C) bits within the HARQ-ACK codebook. Alternatively, the terminal may map NACK to the remaining (B-C) bits within the HARQ-ACK codebook.

FIG. 7 is a conceptual diagram illustrating a first exemplary embodiment of a method for configuring a HARQ-ACK codebook for multi-PDSCH scheduling.

Referring to FIG. 7, a base station may transmit first DCI to fourth DCI to a terminal. The terminal may successfully receive the first DCI, the third DCI, and the fourth DCI, and may not successfully receive the second DCI. Even when the reception of the second DCI fails, the terminal may identify that the base station has transmitted the second DCI to the terminal through signaling (e.g., DAI, C-DAI, T-DAI, etc.) from the base station. The terminal may obtain scheduling information of a first PDSCH including a first TB and scheduling information of a second PDSCH including a second TB through the first DCI, may obtain scheduling information of a third PDSCH including a third TB through the third DCI, and may obtain scheduling information of a fourth PDSCH including a fourth TB through the fourth DCI. HARQ-ACKs corresponding to the first to fourth TBs may be transmitted to the base station at the same timing (e.g., slot n+3). This operation may be performed by the above-described method of indicating a HARQ-ACK timing and the above-described method of determining a HARQ-ACK transmission timing.

The HARQ-ACKs corresponding to the first to fourth TBs may be included in the same HARQ-ACK codebook. According to (Method 240), each DCI (or PDCCH monitoring occasion corresponding to each DCI) may correspond to B bits within the HARQ-ACK codebook, and B may be 3. For example, the exemplary embodiment may be applied to the terminal in which Table 2 (e.g., RRC table) is configured. Referring to FIG. 7, 3 bits corresponding to each of the first to fourth DCIs may sequentially correspond to the HARQ-ACK codebook, and the size of the HARQ-ACK codebook may be 12 (=4×3) bits.

According to the method described above, each DCI may schedule 3 or less TB(s). Two HARQ-ACKs for two TBs scheduled by the first DCI may be mapped to two bits (e.g., $b_0$ and $b_1$) among bits $b_0$, $b_1$, and $b_2$ corresponding to the first DCI within the HARQ-ACK codebook. The terminal may assign a value agreed in advance with the base station to the remaining one bit (e.g., $b_2$) corresponding to the first DCI within the HARQ-ACK codebook. One HARQ-ACK for one TB scheduled by the third DCI may be mapped to one bit (e.g., $b_6$) among three bits $b_6$, $b_7$, and $b_8$ corresponding to the third DCI within the HARQ-ACK codebook. The terminal may assign a value agreed in advance with the base station to the remaining two bits (e.g., $b_7$ and $b_8$) corresponding to the third DCI within the HARQ-ACK codebook. One HARQ-ACK for one TB scheduled by the fourth DCI may be mapped to one bit (e.g., $b_9$) among $b_9$, $b_{10}$, and $b_{11}$ corresponding to the fourth DCI within the HARQ-ACK codebook. The terminal may assign a value agreed in advance with the base station to the remaining two bits (e.g., $b_{10}$ and $b_{11}$) corresponding to the fourth DCI within the HARQ-ACK codebook. On the other hand, since the terminal fails to receive the second DCI, HARQ-ACKs may not be mapped to three bits $b_3$, $b_4$, and $b_5$ corresponding to the second DCI within the HARQ-ACK codebook. Alternatively, the terminal may assign a value (e.g., NACK or a bit value corresponding to NACK) agreed in advance with the base station to the three bits corresponding to the second DCI within the HARQ-ACK codebook.

The above-described method may be equally applied to SPS. For example, in the above-described exemplary embodiment, PDSCH(s) and TB(s) scheduled by one DCI may correspond to PDSCH(s) and TB(s) scheduled (or received) within one SPS period, respectively. The terminal may transmit HARQ-ACK(s) for the TB(s) scheduled within one SPS period to the base station using the above-described method.

On the other hand, a HARQ-ACK for a TB scheduled by a dynamic grant (e.g., C-RNTI, MCS-C-RNTI) and a HARQ-ACK for a TB scheduled by an SPS (e.g., CS-RNTI) may be included in the same HARQ-ACK codebook. In this case, the above-described method may be applied to mapping of both HARQ-ACK by a dynamic scheduling and HARQ-ACK by SPS. For example, when (Method 240) is used, each DCI in the dynamic scheduling may correspond to a payload of B bits within the HARQ-ACK codebook, and each SPS period in the SPS may correspond to a payload of B bits within the HARQ-ACK codebook. That is, the number of downlink TB(s) that can be scheduled within one SPS period may not exceed B, and the number of HARQ-ACK bits corresponding to one SPS period may be B. For example, when B=3, each of DCI(s) and SPS period(s) associated with a certain HARQ-ACK codebook may correspond to a 3-bit payload within the corresponding HARQ-ACK codebook. Similarly to the exemplary embodiment of FIG. 7, when the number of TBs transmitted within one SPS period is less than 3, HARQ-ACK(s) for the TB(s) may be mapped to a portion of 3 bits within the HARQ-ACK codebook.

Alternatively, when a HARQ-ACK for a TB scheduled by a dynamic grant (e.g., C-RNTI, MCS-C-RNTI) and a HARQ-ACK for a TB scheduled by an SPS (e.g., CS-RNTI) are included in the same HARQ-ACK codebook, the above-described method may be applied to the HARQ-ACK by dynamic scheduling, and may not be applied to the HARQ-ACK by SPS. For example, when (Method 240) is used, each DCI in the dynamic scheduling may correspond to a B-bit payload within the HARQ-ACK codebook, and each SPS period in the SPS may correspond to a D-bit payload within the HARQ-ACK codebook. Here, D may refer to the number of downlink TBs transmitted in each SPS period. D may be a natural number less than or equal to B. Alternatively, it may be allowed for D to be set to have a value greater than B. According to the above method, the number of bits occupied by each DCI and the number of bits occupied by each SPS period within the HARQ-ACK codebook may be the same or different from each other.

A HARQ-ACK for a TB scheduled by a dynamic grant (e.g., C-RNTI, MCS-C-RNTI) and a HARQ-ACK for a DCI indicating release of an SPS PDSCH may be included in the same HARQ-ACK codebook. Also in this case, a method similar to the method described above may be used. For example, when (Method 240) is used, the DCI indicating release of an SPS PDSCH may correspond to B bits within the HARQ-ACK codebook. The HARQ-ACK for the DCI may have a size of 1 bit, and when B>1, the 1-bit HARQ-ACK may be mapped to a portion of the B bits within the HARQ-ACK codebook. Alternatively, the DCI indicating release of an SPS PDSCH may correspond to one bit within the HARQ-ACK codebook regardless of B. For example, the 1-bit HARQ-ACK for the DCI indicating release of an SPS PDSCH may be mapped to one bit within the HARQ-ACK codebook.

In general, the above-described method may be applied equally or similarly to a case where two or more among a HARQ-ACK for a TB scheduled by a dynamic grant (e.g., C-RNTI, MCS-C-RNTI), a HARQ-ACK for a TB scheduled by an SPS (e.g., CS-RNTI), and a HARQ for a DCI indicating release of an SPS PDSCH are included in the same HARQ-ACK codebook. For example, when three HARQ-ACKs are included in the same HARQ-ACK codebook, each of the scheduling DCI, the SPS period, and the SPS release DCI may correspond to B bits, D bits, and E bits within the HARQ-ACK codebook.

[Type 1 HARQ-ACK Codebook]

When a type 1 HARQ-ACK codebook is used, a terminal may estimate HARQ-ACK(s) likely to be transmitted at a specific timing (e.g., slot, subslot) from candidate TB(s) likely to be scheduled (i.e., received) from a base station, map the HARQ-ACK(s) to the HARQ-ACK codebook, and transmit the HARQ-ACK codebook at the specific timing. For single PDSCH scheduling, each candidate TB may be transmitted on one or more PDSCH(s). One or more PDSCH(s) corresponding to one TB may be referred to as 'candidate PDSCH reception', 'candidate PDSCH occasion', 'PDSCH occasion', or the like. One HARQ-ACK may be mapped to one bit of the codebook for each PDSCH occasion. When repetitive PDSCH transmission is used for a TB, a HARQ-ACK timing of the TB may be defined based on a reception timing of the last PDSCH occasion corresponding to the TB. PDSCH occasions mapped to the same HARQ-ACK codebook may be simultaneously received by the terminal. For example, time resources (e.g., symbols) of the PDSCH occasions mapped to the same HARQ-ACK codebook may not overlap each other.

In case of multi-PDSCH scheduling, PDSCH occasions may be defined in different manners. For example, when (Method 200) is used, a PDSCH occasion may mean PDSCH(s) corresponding to TB(s) likely to be scheduled through one downlink DCI (or TB(s) likely to be transmitted within one SPS period). A PDSCH occasion may include N1 TB(s), and N1 HARQ-ACK(s) corresponding to the N1 TB(s) may be mapped to N1 bit(s) within the HARQ-ACK codebook. N1 may be a natural number. N1 may be the same or different for each PDSCH occasion, and a plurality of PDSCH occasions may correspond to a different number of bit(s) or the same number of bit(s) within the HARQ-ACK codebook. According to (Method 200), TB(s) scheduled through one DCI may be included in the same HARQ-ACK codebook at the same time, and the same HARQ-ACK codebook may be transmitted. The transmission timing of the HARQ-ACK codebook may be defined based on a reception timing of the last PDSCH among PDSCH(s) constituting the PDSCH occasion.

FIG. 8 is a conceptual diagram illustrating a second exemplary embodiment of a method for configuring a HARQ-ACK codebook for multi-PDSCH scheduling.

Referring to FIG. 8, a terminal may receive configuration of an RRC table for PDSCH time domain resource allocation, and the RRC table may include two entries. An entry 0 may include two SLIVs, and according to the two SLIVs, scheduling of PDSCHs including two TBs may be indicated to the terminal. An entry 1 may include one SLIV, and according to one SLIV, scheduling of PDSCH(s) including one TB may be indicated to the terminal. The terminal may receive configuration of candidate values {1, 2} of K1 indicating a HARQ-ACK timing. At least one of the candidate values of K1 may be dynamically indicated to the terminal by a DCI.

According to an exemplary embodiment, four PDSCH occasions may be mapped to a HARQ-ACK codebook transmitted in a slot n+3. A first PDSCH occasion may include a first PDSCH and a second PDSCH corresponding to candidate TBs (e.g., first TB and second TB) that can be scheduled through a PDCCH of a slot n and the entry 0. According to (Method 200), HARQ-ACKs for the candidate TBs of the first PDSCH occasion may be mapped to two bits (e.g., $b_0$ and $b_1$) within the HARQ-ACK codebook based on a timing of K1=2. The second PDSCH occasion may include a third PDSCH and a fourth PDSCH corresponding to candidate TBs (e.g., third TB and fourth TB) that can be scheduled through a PDCCH of the slot n+1 and the entry 0. According to (Method 200), HARQ-ACKs for the candidate TBs of the second PDSCH occasion may be mapped to two bits (e.g., $b_2$ and $b_3$) within the HARQ-ACK codebook based on a timing of K1=1. A third PDSCH occasion may include a fifth PDSCH corresponding to a candidate TB (e.g., fifth TB) that can be scheduled through a PDCCH of the slot n+1 and the entry 1. A HARQ-ACK for the candidate TB of the third PDSCH occasion may be mapped to one bit (e.g., $b_4$) within the HARQ-ACK codebook based on a timing of K1=2. A fourth PDSCH occasion may include a sixth PDSCH corresponding to a candidate TB (e.g., sixth TB) that can be scheduled through a PDCCH of the slot n+2 and the entry 1. A HARQ-ACK for the candidate TB of the fourth PDSCH occasion may be mapped to one bit (e.g., $b_5$) within the HARQ-ACK codebook based on a timing of K1=1. As a result, the size of the HARQ-ACK codebook may be 6 bits. The terminal may map HARQ-ACK information reflecting a reception result of the PDSCH occasion(s) actually received among the PDSCH occasions to the HARQ-ACK codebook, and may map predefined information or value (e.g., NACK, ACK, '0', or '1') to the HARQ-ACK codebook for the PDSCH occasion(s) not actually received among the PDSCH occasions.

According to another exemplary embodiment, at least some of the PDSCH occasions described in the second exemplary embodiment of FIG. 8 may be SPS PDSCH(s), and the SPS PDSCH(s) may be semi-persistently scheduled by 'SPS configuration' or 'SPS configuration and DCI indication'. Even in this case, the above-described method of configuring a HARQ-ACK codebook may be equally applied.

Meanwhile, the terminal may not expect to receive a scheduling indication or configuration of overlapping PDSCHs (e.g., unicast PDSCHs). Referring to FIG. 8, the second PDSCH occasion (i.e., third PDSCH) and the third PDSCH occasion (i.e., fifth PDSCH) may overlap each other. In this case, the terminal may not expect to receive scheduling information of both the second PDSCH occasion and the third PDSCH occasion, and may consider one of the second PDSCH occasion and the third PDSCH occasion as a PDSCH occasion that can be received. In this case, the terminal may map one of the second PDSCH occasion and the third PDSCH occasion to the HARQ-ACK codebook according to a predetermined priority rule. For example, a PDSCH occasion corresponding to a lower (or higher) entry number may have a higher priority. A PDSCH occasion corresponding to an earlier (or later) PDCCH may have a higher priority. A PDSCH occasion corresponding to a lower (or higher) serving cell ID may have a higher priority. In an exemplary embodiment, according to the method, the terminal may consider that the second PDSCH occasion corresponding to the entry 0 has a higher priority than the third PDSCH occasion corresponding to the entry 1, may map the second PDSCH occasion to the HARQ-ACK codebook, and may not map the third PDSCH occasion to the HARQ-ACK codebook. As a result, the size of the HARQ-ACK codebook may be 5 bits.

For another example, when (Method 210) is used, a PDSCH occasion may mean PDSCH(s) corresponding to at least some TB(s) among TB(s) likely to be scheduled through one downlink DCI (or TB(s) likely to be transmitted within one SPS period). For example, one DCI may schedule N1 TB(s), and a PDSCH occasion corresponding to the one DCI may include PDSCH(s) including N2 TB(s) among the N1 TB(s). N2 may be a natural number less than or equal to N1. N2 HARQ-ACK(s) corresponding to N2 TB(s) may be mapped to N2 bit(s) within the HARQ-ACK codebook. One or more PDSCH occasions may correspond to one DCI. For example, if one DCI schedules three TB(s), the first two TB(s) may be mapped to a first PDSCH occasion, and the last one TB may be mapped to a second PDSCH occasion. TB(s) mapped to each PDSCH occasion may be TB(s) having the same HARQ-ACK feedback timing. According to the above-described method, the HARQ-ACK(s) of each PDSCH occasion may be mapped to the HARQ-ACK codebook according to the HARQ-ACK feedback timing, and the corresponding HARQ-ACK codebook may be transmitted to the base station.

Referring back to FIG. 6A, the terminal may receive scheduling information of the first PDSCH including the first TB and scheduling information of the second PDSCH including the second TB through a DCI, and may transmit the HARQ-ACK for the first TB and the HARQ-ACK for the second TB to the base station at different timing. In this case, the first PDSCH and the second PDSCH may be regarded as different PDSCH occasions. Referring back to FIG. 6B, the terminal may receive scheduling information of the first PDSCH including the first TB and scheduling information of the second PDSCH including the second TB through DCI, and may transmit the HARQ-ACK for the first TB and the HARQ-ACK for the second TB to the base station at the same timing. In this case, the first PDSCH and the second PDSCH may be considered to be included in the same PDSCH occasion.

On the other hand, if preset condition(s) are satisfied even when the terminal is configured to use the type 1 HARQ-ACK codebook, the terminal may perform feedback of HARQ-ACK(s) according to a separate method instead of the above-described method of configuring a type 1 HARQ-ACK codebook. The preset condition(s) may include at least one of 'when the terminal receives one DCI corresponding to a specific HARQ-ACK feedback timing', 'when one DCI has a specific DCI format (e.g., fallback DCI format, DCI format 1_0, etc.)', 'when a C-DAI field included in one DCI has a specific value (e.g., 1)', or 'when one DCI is transmitted in a primary cell (PCell)'. The DCI may schedule one TB or multiple TBs. When the preset condition(s) are satisfied, the terminal may generate only HARQ-ACK(s) for TB(s) scheduled through one DCI, and transmit only the generated HARQ-ACK(s) to the base station at a specific HARQ-ACK feedback timing. For example, when one DCI schedules two TBs, the terminal may transmit 2-bit HARQ-ACKs for the two TBs to the base station through an uplink resource. Accordingly, the amount of the HARQ-ACK information transmitted from the terminal to the base station may be reduced.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. A method of a terminal, the method comprising:
receiving time domain resource allocation (TDRA) configuration information including a first entry including N1 start and length indicator values (SLIVs) and a second entry including N2 SLIVs from a base station;
receiving first downlink control information (DCI) including a first field indicating one entry of the first entry or the second entry from the base station;
identifying a resource of each of one or more PDSCHs based on one or more SLIVs included in the one entry indicated by the first DCI; and
receiving the one or more PDSCHs in the identified resource from the base station, wherein each of the N1 and the N2 is a natural number, when a maximum number of transport blocks (TBs) scheduled by entries included in the TDRA configuration information is L, a number of one or more TBs included in the one or more PDSCHs is N, and the N is less than the L, one or more hybrid automatic repeat request-acknowledgement (HARQ-ACK) bits are mapped to N bits within a HARQ-ACK codebook, and a negative ACK (NACK) is mapped to L-N bits within the HARQ-ACK codebook.

2. The method of claim 1, wherein a number of the one or more PDSCHs is determined based on a number of the one or more SLIVs included in the one entry.

3. The method of claim 1, wherein a number of the one or more PDSCHs is identical to a number of the one or more SLIVs included in the one entry.

4. The method of claim 1, wherein a size of a second field included in the first DCI is determined based on a maximum number of SLIVs indicated by the entries included in the TDRA configuration information, and the second field of the first DCI is a new data indicator (NDI) field or a redundancy version (RV) field.

5. The method of claim 1, wherein a position of each of one or more slots in which the one or more PDSCHs are allocated is determined based on one or more slot offset values indicated by the one entry, and the one or more slots are consecutive slots or non-consecutive slots.

6. The method of claim 1, wherein a maximum number of PDSCHs allocated in one slot by the first DCI scheduling the one or more PDSCHs is 1.

7. The method of claim 1, the method further comprising:
generating the HARQ-ACK codebook including the one or more HARQ-ACK bits for the one or more PDSCHs; and
transmitting the HARQ-ACK codebook to the base station, wherein a size of the HARQ-ACK codebook is independent of a number of the one or more PDSCHs, and the size of the HARQ-ACK codebook is determined based on the maximum number of SLIVs indicated by the entries included in the TDRA configuration information.

8. The method of claim 7, wherein a transmission resource of the HARQ-ACK codebook is determined based on a relative distance from a resource of a latest PDSCH of the one or more PDSCHs, and the relative distance is indicated to the terminal by the first DCI.

9. The method of claim 1, wherein the one or more PDSCHs include different TBs, and the one or more PDSCH are not repeatedly transmitted.

10. The method of claim 1, wherein a second DCI scheduling a second PDSCH is received from the base station, and the second PDSCH scheduled by the second DCI is allocated to a resource earlier than an earliest PDSCH of the one or more PDSCHs scheduled by the first DCI or allocated to a resource later than a latest PDSCH of the one or more PDSCHs scheduled by the first DCI.

11. A method of a terminal, the method comprising:
receiving time domain resource allocation (TDRA) configuration information including a first entry including N1 start and length indicator values (SLIVs) and a second entry including N2 SLIVs from a base station;
receiving first downlink control information (DCI) including a first field indicating one entry of the first entry or the second entry from the base station;
identifying a resource of each of one or more physical downlink shared channel (PDSCHs) based on one or more SLIVs included in the one entry indicated by the first DCI; and
receiving the one or more PDSCHs in the identified resource from the base station,
wherein the N1 is 1, the N2 is a natural number greater than 1, and the first entry or the second entry is selectively indicated by the first DCI so that single PDSCH scheduling by the N1SLIVs and multiple PDSCH scheduling by the N2 SLIVs are dynamically switched.

12. A method of a base station, the method comprising:
transmitting time domain resource allocation (TDRA) configuration information including a first entry including N1 start and length indicator values (SLIVs) and a second entry including N2 SLIVs to a terminal;
transmitting first downlink control information (DCI) including a first field indicating one entry of the first entry or the second entry to the terminal;
identifying a resource of each of one or more PDSCHs based on one or more SLIVs included in the one entry indicated by the first DCI; and
transmitting the one or more PDSCHs in the identified resource to the terminal,
wherein, when a maximum number of transport blocks (TBs) scheduled by entries included in the TDRA configuration information is L, a number of one or more TBs included in the one or more PDSCHs is N, and the N is less than the L, one or more hybrid automatic repeat request-acknowledgement (HARQ-ACK) bits are mapped to N bits within a HARQ-ACK codebook, and a negative ACK (NACK) is mapped to L-N bits within the HARQ-ACK codebook.

13. The method of claim 12, wherein a number of the one or more PDSCHs is determined based on a number of the one or more SLIVs included in the one entry.

14. The method of claim 12, wherein the N1 is 1, the N2 is a natural number greater than 1, and the first entry or the second entry is selectively indicated by the first DCI so that single PDSCH scheduling by the N1 SLIVs and multiple PDSCH scheduling by the N2 SLIVs are dynamically switched.

15. The method of claim 12, wherein a position of each of one or more slots in which the one or more PDSCHs are allocated is determined based on one or more slot offset values indicated by the one entry, and the one or more slots are consecutive slots or non-consecutive slots.

16. The method of claim 12, wherein a size of a second field included in the first DCI is determined based on a maximum number of PDSCHs scheduled by the entries included in the TDRA configuration information.

17. The method of claim 12, the method further comprising:
receiving the HARQ-ACK codebook including the one or more HARQ-ACK bits for the one or more PDSCHs from the terminal,
wherein a size of the HARQ-ACK codebook is independent of a number of the one or more PDSCHs, and the size of the HARQ-ACK codebook is determined based on a maximum number of PDSCH scheduled by the entries included in the TDRA configuration information.

18. The method of claim 12, wherein the one or more PDSCHs include different TBs, and the one or more PDSCH are not repeatedly transmitted.

19. The method of claim 12, wherein a second DCI scheduling a second PDSCH is transmitted to the terminal, and the second PDSCH scheduled by the second DCI is allocated to a resource earlier than an earliest PDSCH of the one or more PDSCHs scheduled by the first DCI or allocated to a resource later than a latest PDSCH of the one or more PDSCHs scheduled by the first DCI.

* * * * *